United States Patent
Towns-von Stauber et al.

(10) Patent No.: US 7,430,179 B2
(45) Date of Patent: Sep. 30, 2008

(54) QUALITY DETERMINATION FOR PACKETIZED INFORMATION

(75) Inventors: Leon Towns-von Stauber, Shoreline, WA (US); Todd Achiles, Seattle, WA (US); Jerry Cady, Ashburn, VA (US); Richard Luck, Bothell, WA (US)

(73) Assignee: Geopacket Corporation, Seattle, WA (US)

( * ) Notice: Subject to any disclaimer, the term of this patent is extended or adjusted under 35 U.S.C. 154(b) by 392 days.

(21) Appl. No.: 10/561,961

(22) PCT Filed: Jun. 18, 2004

(86) PCT No.: PCT/US2004/019336

§ 371 (c)(1),
(2), (4) Date: Dec. 22, 2005

(87) PCT Pub. No.: WO2005/004370

PCT Pub. Date: Jan. 13, 2005

(65) Prior Publication Data

US 2006/0153174 A1    Jul. 13, 2006

Related U.S. Application Data

(60) Provisional application No. 60/483,781, filed on Jun. 28, 2003.

(51) Int. Cl.
*G01R 31/08* (2006.01)
(52) U.S. Cl. .................................. 370/252
(58) Field of Classification Search .......... 370/356, 370/263–264, 271, 229, 230, 235, 351–352, 370/252, 241
See application file for complete search history.

(56) References Cited

U.S. PATENT DOCUMENTS

| | | | | |
|---|---|---|---|---|
| 6,370,120 B1 * | 4/2002 | Hardy | ........................ | 370/252 |
| 6,512,746 B1 | 1/2003 | Sand | | |
| 6,700,953 B1 * | 3/2004 | Maurer et al. | ............ | 379/88.01 |
| 6,798,745 B1 | 9/2004 | Feinberg | | |
| 6,850,525 B2 * | 2/2005 | Mitsumori et al. | ...... | 370/395.52 |
| 6,990,071 B2 * | 1/2006 | Adam et al. | ................ | 370/230 |
| 7,061,871 B2 * | 6/2006 | Sheldon et al. | ............ | 370/242 |
| 7,075,981 B1 * | 7/2006 | Clark | ........................ | 375/224 |
| 7,117,521 B2 * | 10/2006 | Puthiyedath | ................ | 725/107 |

(Continued)

OTHER PUBLICATIONS

International Search Report mailed Feb. 7, 2005.

*Primary Examiner*—Kwang B. Yao
*Assistant Examiner*—Candal Elpenord
(74) *Attorney, Agent, or Firm*—Miller Patent Services; Jerry A. Miller

(57) ABSTRACT

A method for near real time quality analysis consistent with certain embodiments passively samples packets (616) from a stream of Internet Protocol (IP) packets that represent a communication session between a pair of end points carrying signals being transmitted over a transmission path in an IP network, and determines (620) in near real time at least two metrics from the sampled packets for the communication session. The at least two metrics include at least one metric that measures a quantity of lost packets, and at least one metric that measures a characteristic of packet timing. The method further involves calculating (632) a quality score in near real time using a quality formula that combines the at least two metrics. This abstract is not to be considered limiting, since other embodiments may deviate from the features described in this abstract.

54 Claims, 12 Drawing Sheets

U.S. PATENT DOCUMENTS

| | | | |
|---|---|---|---|
| 7,151,781 B2 * | 12/2006 | MeLampy et al. | 370/468 |
| 7,197,557 B1 * | 3/2007 | Asar et al. | 709/224 |
| 7,274,670 B2 * | 9/2007 | Hicks et al. | 370/252 |
| 7,382,735 B2 * | 6/2008 | Chong | 370/252 |
| 2002/0015387 A1 * | 2/2002 | Houh | 370/250 |
| 2002/0114296 A1 * | 8/2002 | Hardy | 370/332 |
| 2002/0145979 A1 * | 10/2002 | Baj | 370/242 |
| 2003/0007458 A1 * | 1/2003 | Procopio | 370/252 |
| 2003/0048754 A1 * | 3/2003 | Bruckman | 370/252 |
| 2003/0088671 A1 * | 5/2003 | Klinker et al. | 709/225 |
| 2003/0107990 A1 | 6/2003 | Herschleb et al. | |
| 2003/0223361 A1 * | 12/2003 | Hussain et al. | 370/230 |
| 2004/0071095 A1 | 4/2004 | Raisanen | |
| 2004/0165570 A1 | 8/2004 | Lee | |

* cited by examiner

QUALITY DETERMINATION FOR PACKETIZED INFORMATION

CROSS REFERENCE TO RELATED DOCUMENTS

This application claims priority benefit of provisional patent application Ser. No. 60/483,781 filed Jun. 28, 2003, which is hereby incorporated herein by reference.

BACKGROUND

Historically voice telephone calls have been made using the Public Switched Telephone Network (PSTN). This networking environment has been developed over the past hundred years using technologies that have centered on making telephone companies more efficient through better use of existing wire and new fiber optic facilities. With data usage and the advances in packet technology, Internet Protocol Telephony (IPT) is set to become the preferred networking method thus replacing traditional telephone environments.

The driving factors are compelling for both the economic and application value it brings to service providers, businesses and consumers. From a service provider viewpoint, IPT significantly reduces infrastructure and operational costs. These savings may be passed on to the customer and help the provider improve return on investment. From the customers perspective lower costs are an advantage, but perhaps more compelling is the possibility of data and voice integration applications that were not possible with traditional telephony.

Given the value of service provider and customer migration to IPT, it is not surprising that research studies confirm there is pent up demand to transition to IPT. A key assumption supporting this demand is that the fundamentals of reliability and voice quality can be at least consistent with, if not better than, the traditional telephone network. It is likely that customers will only move to IPT if the service levels and voice quality of IPT meet these standards. The traditional providers have set a very high bar for uptime and voice quality, and consumers have come to expect close to perfection. The challenge to the IPT service provider is to raise the bar that was set by matching voice quality and service levels then raise it through enhanced application service offerings.

The current state of IPT testing is focused on network and carrier testing but is wholly inadequate for measuring the customer experience.

BRIEF DESCRIPTION OF THE DRAWINGS

Certain illustrative embodiments illustrating organization and method of operation, together with objects and advantages may be best understood by reference detailed description that follows taken in conjunction with the accompanying drawings in which.

DETAILED DESCRIPTION

Figure 1:
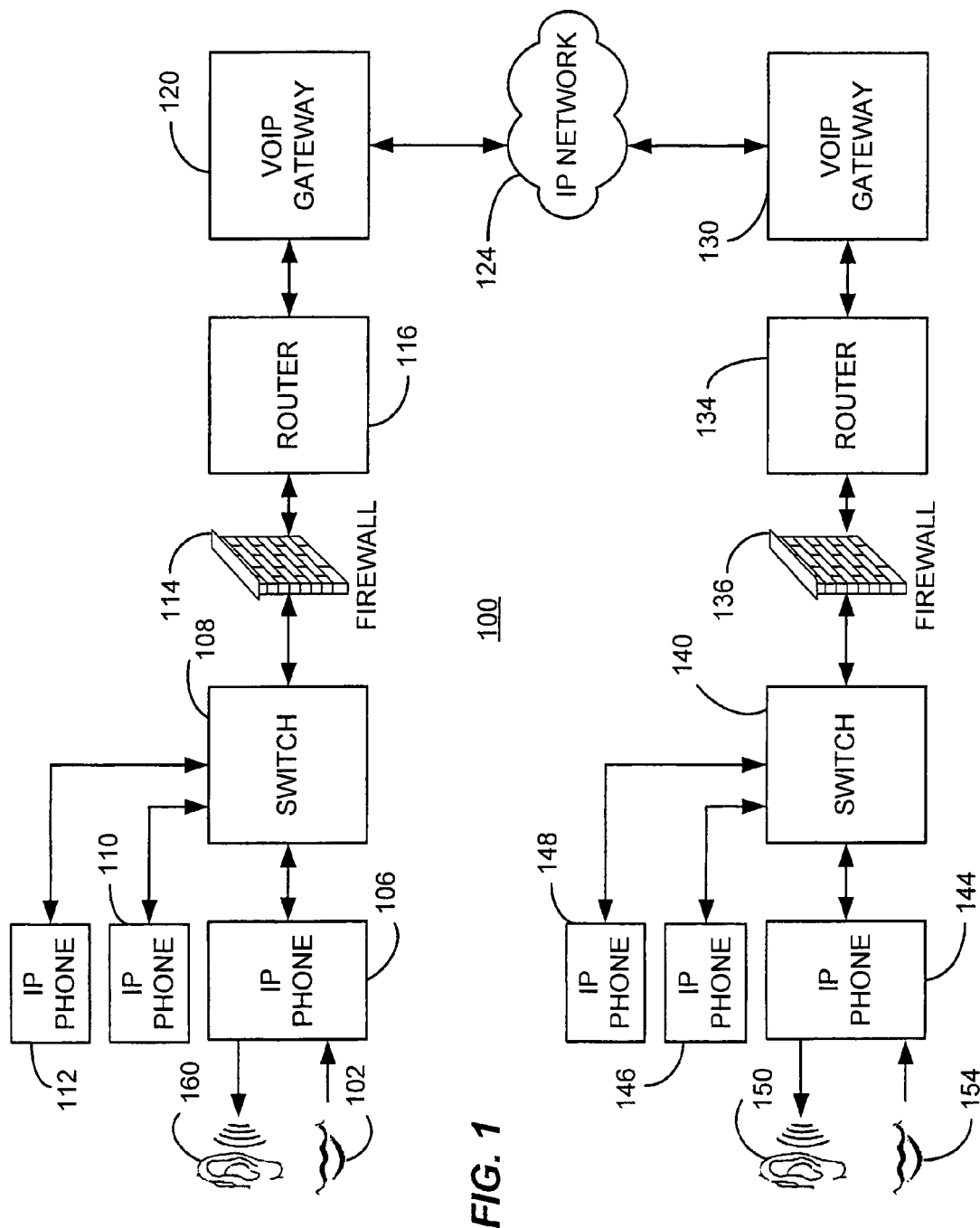
FIG. 1 is a block diagram of a voice over Internet Protocol (VoIP) network.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program", as used herein, is defined as a sequence of instructions designed for execution on a computer system. A "program", or "computer program", may include a subroutine, a function, a procedure, an object method, an object implementation, in an executable application, an applet, a servlet, a source code, an object code, a shared library/dynamic load library and/or other sequence of instructions designed for execution on a computer system.

The term "near real time" is used in this document to mean that an action (e.g., a calculation) is carried out at a time very close to an actual event so that the action is for practical purposes taken approximately in real time. For example, a decoder that decodes a stream of data in near real time could receive the data, decode it and then output the data in a manner transparent to the user. A non-real time decoder might store the data in a file and then operate on the file to carry out the decoding. Thus, by way of a contrasting example without limitation, a non-real time action might involve storing information for retrieval at a significantly later time before an action is taken. In the context of the present discussion, near real time can be as long as several seconds or even several minutes, since the early stages of degradation of session quality can be detected and actions can be taken without significant impact to the customer and the customer experience can remain high. This is contrasted with non-near real time actions which might only provide insight into what happened in retrospect to cause call or session quality to seriously degrade, without the ability to execute preemptive measures.

Telecommunications networks have gone through an evolution that has created a culture centered on a connection based network and a service provider centric view of network management. A brief review of this history is instructive in understanding the evolution of IPT.

Initially all calls were carried on a single dedicated wire that was connected or cross connected by an operator on a switchboard. Once the connection was made, the callers talked on a pair of wires transporting analog signals from end to end. In this environment, degradation in call quality was determined primarily by signal loss caused by distance and the number of connections frequently resulting in low volume and static. The voice quality solution in this environment was, in part, analog signal regeneration and movement to automated switching centers.

As time and acceptance of the telephone progressed it became impractical and problematic to continue stringing new phone wires to meet demand. This problem was solved by the development of technology that allowed more than one phone conversation to be held simultaneously on a pair of wires creating a multiplexed environment. First analog frequencies were split using frequency division multiplexing (FDM) and multiple calls over a single wire became possible. Using this method, voice quality was somewhat degraded and alas demand outstripped the capacity and again a new method was needed.

The concept developed to resolve both these problems was the introduction of digital signal technology. This technology converted the analog spoken word into digital signals allowing high quality transmission of multiple phone calls over a single transport facility. The technology of pulse code modulation (PCM) was the first introduction of digital technology requiring special testing techniques to measure voice quality. The signal conversion occurred in a coder, de-coder (CODEC). Voice quality testing was accomplished simply by converting signals back to analog using the same CODEC and measuring the analog signal in the same manner the caller would hear the call—a simple but effective solution.

This brief history of the migration from analog to digital in the telephone network set the stage for a continuing need to gain more and more efficiency in telephone company networks and the requirement to change testing techniques to adapt to new technology and customer demand for quality.

As technology advanced, additional efficiencies were gained through the introduction of embedded signals in the call that caused the network to take action unrelated to the voice conversation being held. This introduction of packet technology created a revolution in the telephone company's core network. The delivery of high quality analog signals was then relegated to the "last mile" (from the phone company's switching center to end users).

In the 1990's customers began to adopt data applications at tremendous rates and the same capacity strains experienced with early telephone deployments and a lack of facilities began to appear in the last mile network. This problem became severe in the late 1990's and was addressed by the introduction of competitive network builds in the local and long haul facilities. These network builds again primarily incorporated the same technology used in traditional systems.

In every instance traditional telephony has been able to replicate what the customer is hearing. This has been a cornerstone in maintaining the high level of service that customers expect today.

Traditional telephony is managed by shared responsibility between the carrier and the customer. This shared responsibility requires a clear line be drawn between the two parties. The traditional phone company will generally only accept responsibility to the last point where they have test capabilities from their central offices, beyond that point it is the customer responsibility to maintain and manage the environment. The result is a demarcation point that determines how the user handles troubles or problems.

In the mid 1990's companies began to embrace the Internet and its core protocol (IP) as a preferred method to access data information. The convenience, availability, applications and relatively low cost created compelling reasons to begin using IP and the World Wide Web (WWW) as the data transport methodology of choice. This environment uses packet technology to transport and deliver information between networks and individual desktop computers. It is highly efficient in the way it takes advantage of associated but separate computer networks to accomplish its mission of delivering information. Using voice transport technologies initiated by telephony needs over this data network has presented both opportunities and problems. It has become possible to transport voice telephone calls over IP (VoIP-voice over IP) and further to have voice and data applications interact because of the use of a common protocol. The problems come from two primary areas: the differences in the ways networks are managed and the way in which voice quality is determined.

Any technology, be it VoIP or any other technology, that replaces traditional telephony transport and delivery should at least replicate the voice quality of traditional telephony as gauged by the tried and true quality barometer: the human ear. To date, quality assurance testing of IP Telephony has been data centric. However, monitoring and testing methods are drastically different between voice and data. Therefore new methods of testing IPT, methods that are voice centric are needed.

IPT and traditional telephony differ in many ways but have a common goal of delivering voice communication in real time between two or more parties. The nature of IP is such that this delivery can be affected by variables different than those that affect traditional phone calls. One of the biggest differences with IPT versus other techniques is that analog voice information can be converted into a data packet immediately (as early as within the phone itself) and can remain as data until it reaches the phone at the other end. Thus, measuring analog voice quality, as it is perceived by the caller, is fundamentally different than with traditional telephony which uses analog transmission over substantial distances.

Similar to PCM as outlined above, IPT relies on CODEC technology to convert information from analog to digital signals and compress the information. But unlike PCM, the CODEC adds network-signaling information at the customer premise—perhaps even at the end user's desktop. Add to this a high dependence on the customer local area network (LAN) and its equipment infrastructure, and what you end up with is an extension of a network that was once the sole domain of the service provider or telephone company, and that now incorporates the customer's own LAN and all its vagaries.

One example of a basic IPT system 100 is depicted in FIG. 1. In this network, speech from a user at 102 is converted to packetized IP protocol data by an IP telephone 106. This data are passed through an appropriate switch 108 along with data from other IP phones such as 110 and 112 and perhaps a firewall 114 to a router 116 and a VoIP gateway 120 where the packets enter an Internet Protocol network 124 (i.e., the Internet, or an IP protocol LAN (Local Area Network) or WAN (Wide Area Network). The packets are routed through the IP network 124 and emerge at a similar arrangement on the receiving side. The packets first enter a VoIP gateway 130 and pass through an appropriate router 134 through firewall 136 to a switch 140. The switch 140 passes the packets to the destination IP telephone 144 (or IP phones 146 and 148, etc.) where the packets are converted to analog audio signals for listening at 150 by the recipient. At the recipient end, a similar process takes audio originating at 154 through the same network in the opposite direction to emerge at the other side at 160.

In a network such as network 100 (or any IPT network), a number of factors can affect IPT voice quality. Keeping in mind that IP was originally designed and optimized for data traffic, the network's characteristics are specifically not optimized for providing high quality voice. In the data environment, information is generally not time sensitive, has little concern for lost bits of the information stream (as it can be retransmitted) and is not particularly affected by variations in the packet-to-packet delivery timing. Voice, on the other hand, can be adversely affected by any or all of these issues.

For purposes of this document, several characteristics of the transport of packets are of particular interest. The terms for these characteristics will be defined as follows, with the definitions refined later: The term "latency" as used herein, is the time it takes for a voice packet to leave the originating end and arrive at the destination. High latency with respect to voice usually results in an echo-like effect. The term "Packet Loss" as used herein refers to information that is sent from a source point A and is not delivered to the intended destination point B, for whatever reason. Packet loss can cause an unintended clipping, choppiness or silence during a call. The term "Jitter", as used herein, is the variation in the delay time from one packet to the next. In traditional telephony, all network components are carefully timed by a master clock keeping each piece of information in strict time sequence. With IPT, gateways, routers, switches and firewalls make mostly individual decisions as to when to forward voice packets. This can result in this variation in packet-to-packet delivery time causing the call to have a "warble" effect.

While it is relatively easy to adjust network equipment to ensure optimization for voice, it is difficult to identify when and where a problem exists, quantifying the voice quality degradation, and determining what factor or factors are causing the voice quality degradation.

CODECs used in IPT are often quite adept at adjusting to most quality impacting events. Where they often have pronounced difficulty is in "understanding" the effect on the listener when one or more quality degrading events occurs. Simply monitoring latency, packet loss and jitter will not necessarily tell the service provider what the caller is experiencing.

There are a number of causes of poor voice quality. The causes of poor voice quality can be attributed to almost any piece of network equipment (active devices) that acts upon the voice packet information or the transport network itself. IPT is highly dependent on logical transport and route management where traditional telephony is generally affected more by physical transport management. The result of these different transport management methods is that IPT voice quality management is far more critical than traditional telephony because of the greater number of systems and routing options in IPT than traditional telephony.

IPT uses statistical management to determine voice packet forwarding and routing. By its nature statistical management makes decisions on which packets go at what time and to whom. During times of high traffic load, the packet processors need to make critical decisions on what voice information to send and when to send it. This means that inevitably some packets will be dropped or lost. As stated earlier, this is not critical for data, because data can be resent. But when information is dropped in the middle of a voice call, the information cannot be resent. The net result is a "chopping" or "clipping" effect heard by the listener. Poor congestion management can thus result in poor voice quality.

Errors occurring on the physical transport facility can cause the same effect as congestion. If an error is taken on a physical transport facility the entire voice packet can be lost. In traditional telephony most transport will be unaffected by low error rates on the physical transport facilities.

In all the router and gateway environments that make up pieces of an IPT network, decisions are made giving priority of some packet information over others. If prioritization is not optimized for voice traffic, delay can occur producing loss of packets jitter or latency as a result causing poor voice quality.

The ability of the network equipment to process packet information in a timely manner is important to moving packets quickly to the next destination. Processor load can cause delay in forwarding packets and also result in jitter, latency or packet loss, causing poor voice quality.

In most packet networking equipment, information is stored in memory prior to forwarding to the processor. If memory becomes full or overloaded, voice packets can be dropped causing voice packet loss and poor voice quality.

In order for the IPT telephone experience to achieve high quality, the experience should be appropriately managed. Fundamentally, caller experience is the same with IPT as with traditional telephony. The user generally does not care what mechanism is used to transport the telephone call. It is only important that the call be clear and reliable. Because the ear is an analog hearing device, an important point of measurement is where the digital information is converted to analog. But unlike traditional telephony, it is either impossible or impractical to "plug in" a testing device to determine the quality of a call. Therefore, the digital information should be measured in a way that mimics what the human ear processes, and/or detects parameters that can be translated to call quality.

Figure 2:
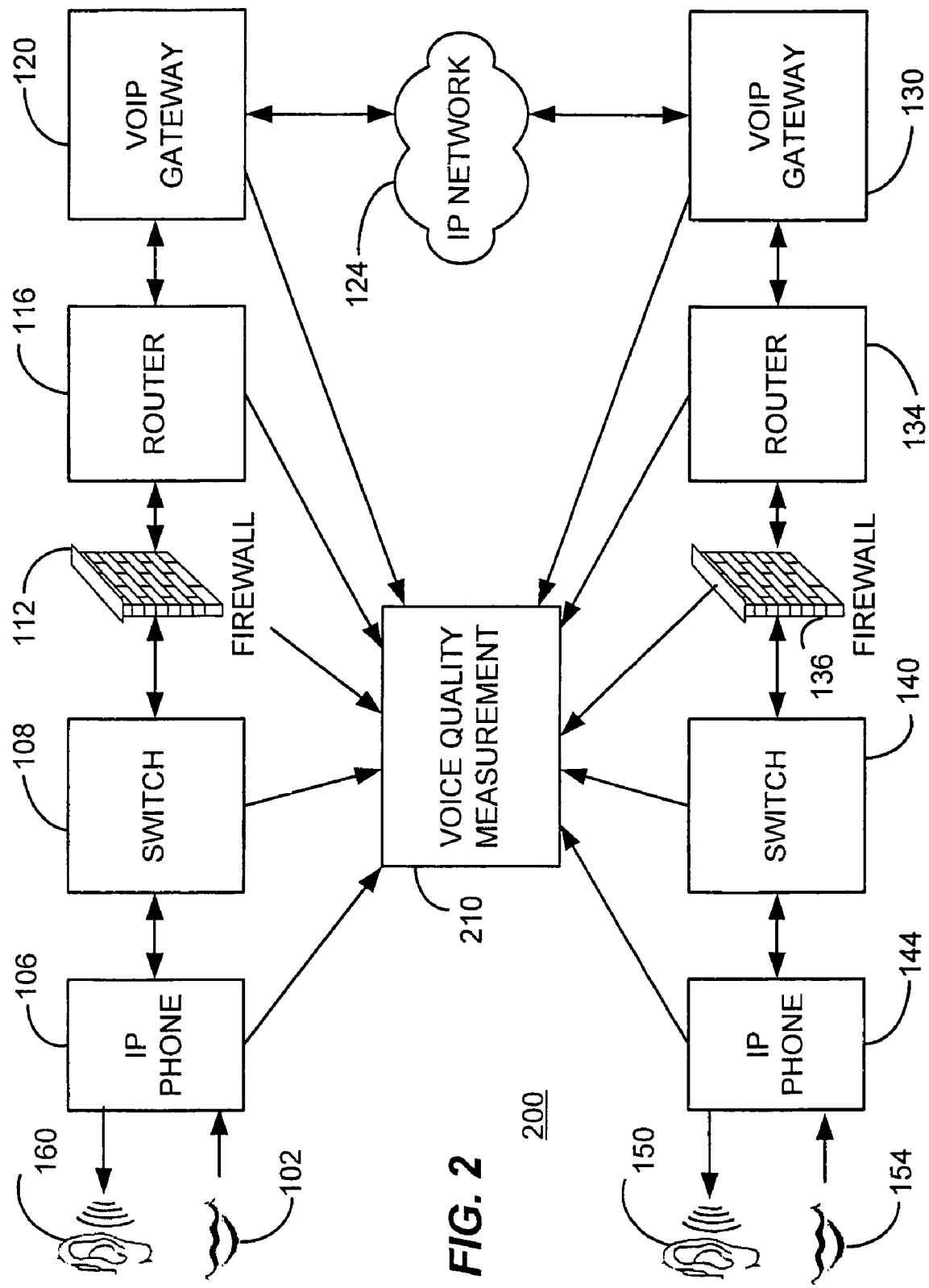
FIG. 2 is a block diagram of a VoIP network with voice quality measurement points indicated consistent with certain embodiments of the present invention.

FIG. 2 depicts a network 200 similar to that of FIG. 1, except illustrating that various metrics of voice quality can be measured using an appropriate voice quality measurement device 210, at any of numerous points in the network prior to entering the IP network 124. In some instances, the IP network 124 itself, in whole or in part, may also be measured to provide useful metrics related to quality.

Figure 3:
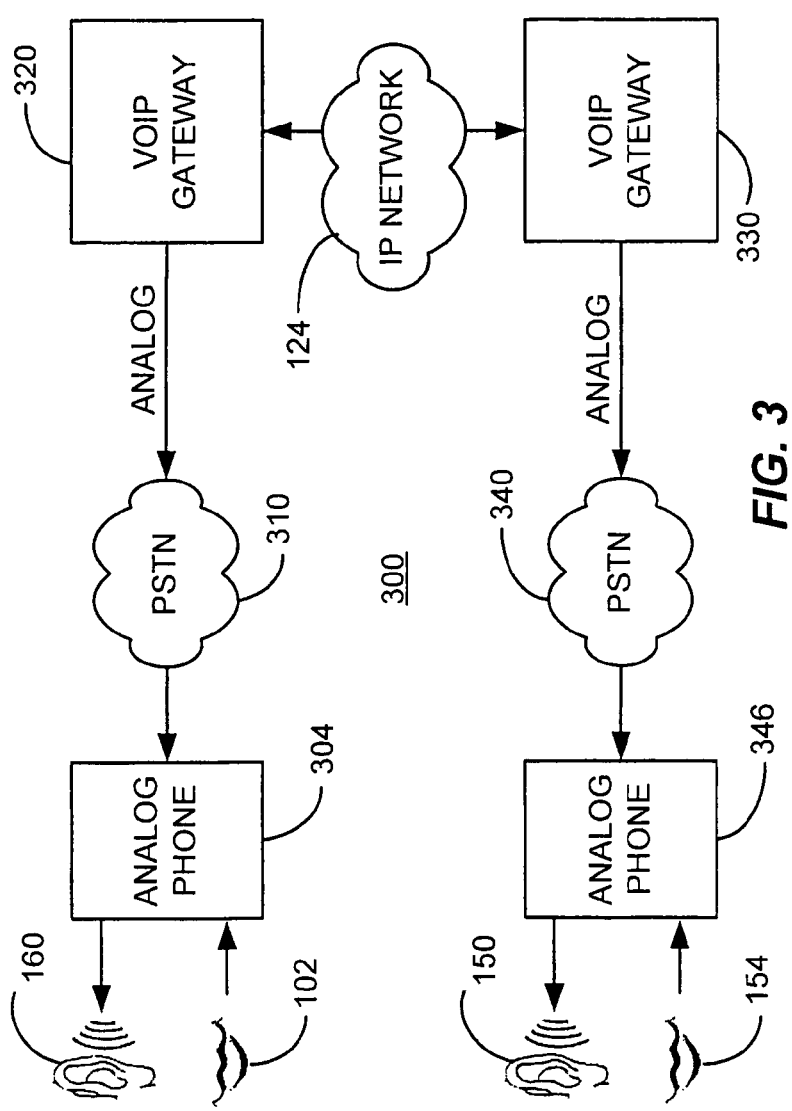
FIG. 3 is another VoIP network configuration.

With end-to-end IPT it is possible and generally most desirable to deliver the pure IP call information as close to the caller as possible. This allows for deep voice and data integration to the user phone and desktop computer. Certain partial IPT implementations, as illustrated by the network 300 of FIG. 3, convert digital to analog near or at the edge of the customer network rather than at the end user desktop or handset. This is done either within the service provider network or at the customer private branch exchange (PBX) in order to lower customer usage costs. A partial implementation, however in most instances, makes it difficult or impossible to get the optimal value in IPT.

In network 300, an analog telephone 304 takes input from 102 and delivers analog signals to the PSTN (Public Switched Telephone Network) 310 which provides analog signals to a VoIP gateway 320. In this system, the signal is analog until reaching the VoIP gateway which coverts the analog signals to IP protocol packetized data that is passed over the IP network 124 to a destination VoIP gateway 330. At 330, the digitized packets are converted back to analog where they are passed through the PSTN 340 to an analog telephone 346 for the user at 150. In a similar manner, speech originating at 154 and destined for 160 is processed in the reverse direction.

In order to ensure that testing monitors the actual customer experience, monitoring a session from CODEC to CODEC may be the most (and possibly only) valid testing point. The challenge comes because it is generally impractical to install dedicated testing systems at each CODEC or customer phone. Thus, to resolve this issue, testing methods should preferably be developed without dedicated equipment at each CODEC end point, but that still produce CODEC to CODEC test results.

Perceptual measurement techniques such as PSQM (Perceptual Speech Quality Measurement) and PESQ (Perceptual Evaluation of Speech Quality) measure the difference between a reference analog signal and a degraded analog output. These techniques use a known reference, usually a standardized recorded phrase in order to accurately measure a call. They generally use a controlled environment and outboard testing systems. Testing using PSQM and PESQ have become preferred methods during network setup and general network failures. Although accurate, these methods are impractical at customer locations due to the cost of testing systems and the intrusive nature of the test. These are best suited for use within the service provider network.

Many service providers attempt to avoid the potential problems of voice quality by overbuilding the transport and network components. This environment, although initially effective, only masks the potential long-term problem and reduces the value of IPT because network efficiency is not maximized. With the current abundance of capacity this method is initially attractive but does not effectively prepare the network environment for the inevitable need to maximize utilization.

Some providers and users resort to reactive management based on customer complaint. Once a caller complains, an engineer or technician can draw statistics from different network elements and deduce suspected causes. Then, largely by trial and error, corrections are made to the network. This is highly undesirable in an environment where callers expect high quality or perfection on every call.

In accordance with certain embodiments consistent with the present invention, actual telephone calls are measured, preferably from end to end, in order to provide an effective measurement of the caller experience. In this manner, measurements can be effective in assuring a caller experience is on par with traditional telephony.

Certain embodiments consistent with the present system results in the following preferred environment:
  Every call or session (or at least a representative sample) is preferably measured
  Testing is preferably CODEC to CODEC, Caller to Caller
  The actual caller experience is preferably evaluated and reported
  Call quality events and problems are preferably isolated to specific network sections and components
  Management information is preferably presented in near real time In accordance with certain embodiments consistent with the present system, actual calls (or other multimedia communication sessions) are used to evaluate the caller experience. Information is derived from the packet stream of the call and applied to an algorithm that assigns a score to the call.

If the call's score is outside predetermined acceptable limits, proactive measures can be taken to improve call quality. In most cases, such measures can be taken before the caller even perceives the deviation in quality that caused the proactive measures to be taken. In certain embodiments, this provides a substantial enhancement to existing VoIP technology since actions can be taken proactively to correct problems, often before they are noticed by the customer, and thus providing a mechanism to provide enhanced VoIP service quality.

Figure 4:
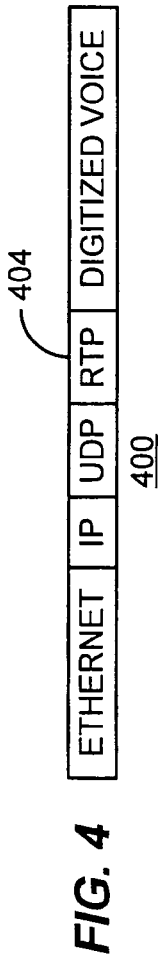
FIG. 4 illustrates the use of the RTP data in a manner consistent with certain embodiments of the present invention.

This approach derives information from the real-time transport protocol (RTP) information of the voice packet as illustrated in the packet diagram 400 of FIG. 4, and applies a calibrated formula to determine a quality score of the call. The RTP data are shown as 404. By making calculations from embedded data within the IP packet, tests are completely non-intrusive and passive.

Figure 5:
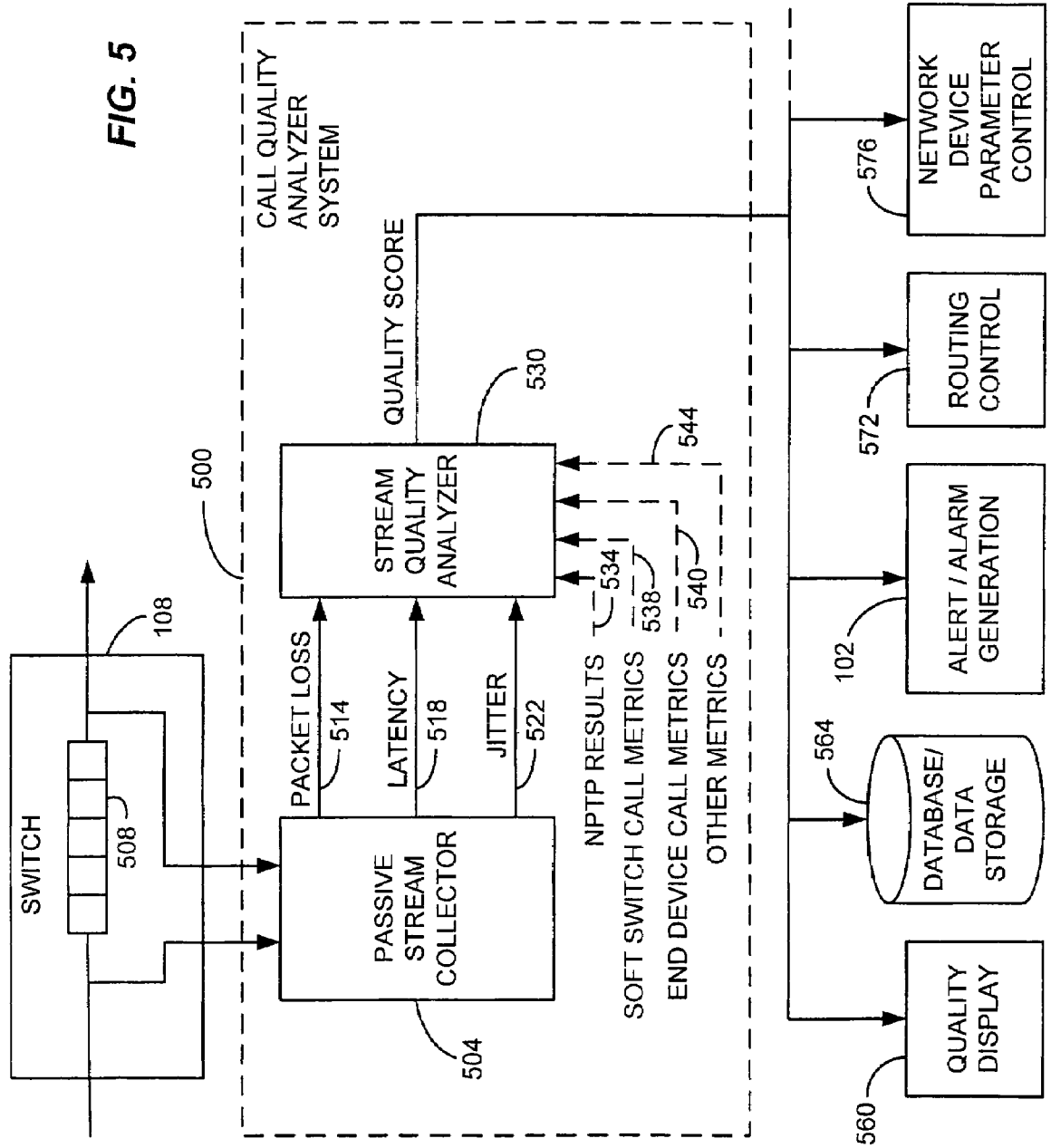
FIG. 5 is an illustration of a VoIP quality measurement system consistent with certain embodiments of the present invention.

With reference to FIG. 5, in certain embodiments consistent with the present invention, a Call Quality Analyzer (CQA) 500 is embodied as software running on a programmed processor (such as a computer), that provides a real-time view of conditions affecting voice quality on a Voice-over-IP (VoIP) network. The software can reside on one or more computer systems on the network, and collects data from one or more sources, including (but not limited to):
  Samples of network communications, in which digitized voice or other multimedia is carried in Real Time Protocol (RTP) packets
  Metrics contained within Real Time Control Protocol (RTCP) packets
  Network Performance Test Probes (NPTP) such as Service Assurance Agent (SAA) probe results and their equivalent (all equivalent and similar such results are referred to herein as NPTP results without limitation) such as those recorded on a Cisco brand VoIP gateway or other network device
  Call metrics stored on a softswitch or other VoIP (or multimedia IP) network element
  Call metrics stored on a handset or other end-device Thus, in accordance with certain embodiments consistent with the present invention, any number of call metrics can be leveraged to produce a call quality score that can be used to maintain high call or session quality.

As depicted in FIG. 5, CQA 500 uses a passive stream collector 504 to sample a stream of packets 508 in the network. These packets 508 could be passively sampled at any number of places, but in the illustrated embodiment, the samples are taken at the input and/or output of switch 108 (e.g., in network 100) in order to most closely sample the voice quality from CODEC to CODEC.

When the term "passive" is used in connection with the passive stream collector 504, the term is intended to mean that the stream collector 504 simply reads passing packets without disturbing them. The stream collector 504 does not block, route, delay, relay or in any other way influence the packets it is collecting (no effect from source to destination). In other words, collector 504 simply acts in the capacity of an observer that has no effect on the traffic it is observing. Thus, the passive stream collector 504 does not operate as a part of an active element of the network and is completely non-intrusive to an existing network. In certain preferred embodiments, the passive stream collector 504 is implemented as a software process residing on a server that is separate from any of the active network components that actually handle movement of the data traffic (e.g., phone, gateway, switch, router, etc.).

In certain preferred embodiments, the passive stream collector 504 operates on a server that preferably is physically situated near a switch. This enables CODEC to CODEC testing of analog signal quality. The passive stream collector 504 processes whatever packets it sees. If it sees packets coming from an IP telephone, it processes those packets. If it is connected to a switch to process all packets to and from the switch it processes those packets. The passive stream collector 504 should preferably see at least all of the signaling and media packets for at least one direction of an entire call or session. In a preferred implementation, the passive stream collector is attached to a switch (e.g., 108 and/or 140) which redirects copies of all packets going through the switch to the passive stream collector 504. Other implementations are also possible within the scope of embodiments consistent with the present invention.

The packet stream samples are then analyzed to determine values for packet loss (P) at 514, latency (L) at 518 and jitter (J) at 522 and/or other packet timing information. This data are then plugged into a quality formula at a stream quality analyzer 530. Stream quality analyzer, in the current embodiment, is a programmed process operating on a computer that may reside at a centralized remote location such as a call center or may reside on the same computer used to implement passive stream collector 504 or may reside on another computer without limitation. If additional data are available such as NPTP results 534, soft switch call metrics at 538, call metrics from handsets or other end-devices 540, and other metrics at 544, this data may also be utilized in the quality formula to produce a quality score output at 550.

The passive stream collector 504, it should be noted, can also sample multiple streams (sessions, etc.) simultaneously using the same instance of the stream collector 504, in accordance with certain embodiments. The setup and teardown of distinct sessions can be determined by information in the signaling protocol that can be recognized by the passive stream collector 504. The quality score can then be generated on a session by session basis so that each score is associated with a pair of end points carrying out the session (e.g., a VoIP telephone call, or other multimedia communication session).

This quality score (Q) can then be used in a number of ways to either manually or automatically take actions to assure that the call quality is at an acceptable level. For instance, the quality score can be displayed at 560 for monitoring by an operator (The values of P, L, J and other metrics may also be displayed.). The data can also be stored for later use or for use in refining the quality score equation at 564. In one embodiment, the quality score is associated with the two end points for the session and stored in a database indexed to these two end points for later use.

When the quality score is displayed, it can be displayed in any number of manners. For example, the display can be generated using a web based or application specific computer program. A grid or various coloring schemes can be used to represent various thresholds or judged quality levels, historical data can be presented for the particular pair of end points, etc. Since multiple sessions can be monitored by the passive stream collector 504, the display can present a display based upon the end point pairs, on a single end point device or on a site or other basis.

The score can also be used to generate an alarm or alert at 568 by comparison of the score with one or more a thresholds to assure that proper intervention is taken if the call quality degrades below acceptable levels. Thus, for example, if the call quality score is made to track the PSQM scale, where a score of 3.4 represents barely noticeable distortion, an alert can be set whenever the call quality degrades below 3.4 or alternatively, another threshold can be set above or below this threshold as desired as will be discussed in greater detail later.

Such thresholds can be determined empirically based upon listening tests or other mechanisms. In this example, larger numbers represent poorer quality, while on other scales smaller numbers may be made to correlate to poorer quality. In either case, when the threshold is crossed in the direction of poorer quality, the quality can be said to fall "below the quality threshold."

In addition, the quality score can be used to effect alternate routings using routing control mechanisms at 572. Also, the individual device parameters within the network can be adjusted at 576 to assure that changing loads, faulty equipment and other variables are properly accounted for to provide optimum call quality.

In certain embodiments, it may be advantageous to aggregate a set of quality score samples to assure that an anomaly within a set of samples does not needlessly cause an alarm or alert or network component reconfiguration.

Thus, a near real time quality analyzer consistent with certain embodiments has a passive stream collector that samples packets from a stream of Internet Protocol (IP) packets that represent a communication session between a pair of end points carrying analog signals being transmitted over a transmission path in an IP network, and determines in near real time at least two metrics from the sampled packets for the communication session. The at least two metrics can include at least one metric that measures a quantity of lost packets, and at least one metric that measures a characteristic of packet timing. A stream quality analyzer receives the at least two metrics and calculates a quality score in near real time using a quality formula that combines the at least two metrics. In accord with certain embodiments, the at least one metric that measures a characteristic of packet timing measures at least one of packet jitter, packet latency, and round trip time.

As previously noted, the CQA is not an active element of the VoIP or other multimedia network; that is, it does not participate in signaling, or otherwise directly interfere with the setup, progress, transportation, or teardown of VoIP or other multimedia sessions. It may, however, provide input to other VoIP or multimedia network elements that may affect VoIP or multimedia sessions based on the input (for example, by rerouting calls to higher-quality links).

From the data collected by the CQA 500, the values of basic network metrics such as jitter, packet loss, and latency are determined for ongoing VoIP or multimedia sessions and/or for links between elements of the VoIP network. These values are then inserted into a formula that generates a numerical quality score characterizing the fidelity of vocal communications during the session or carried over the link. Scores are generated frequently and preferably made available for display (for instance, from a web server) or further processing.

The formula is not necessarily a steady state formula. It is determined by calibration of each deployment and varies based upon the equipment configuration primarily, but not exclusively, based on the IP device (i.e., the IP telephone or IP video appliance, etc.). Recalibration of the formula may be needed when changes are made to the network.

One system strength of certain embodiments is the ability to create a series of formulas for different CODECs and devices. That is, if a Manufacturer X phone is using CODEC 1, and a Manufacturer Y phone is using CODEC 2, then the perceived voice quality to the end user can be scored on each device using different formulae based on prior knowledge of the type of device at each end, all of which can be done in the same near real time manner.

In one embodiment, the formula is determined by correlating samples of network metrics (jitter, packet loss, latency) to empirical observations of quality. These observations may be subjective (e.g., ratings by human listeners) and/or objective (e.g., scores produced by computerized voice quality testers). The formula is calibrated to generate quality scores that should closely reproduce the results of empirical observations. The range and distribution of scores can be made to correspond to any commonly used voice scoring system, such as for example Mean Opinion Score (MOS), PSQM, PESQ, Measuring Normalized Blocks (MNB), or R factor (transmission Rating factor), so that the meaning of the numerical scores will be evident to those familiar with the scoring system.

Evaluating whether a telephone call is good or bad is highly subjective. The uniqueness of the human ear and the ability of a listener to discern sound variations make the objective, consistent measurement of call quality difficult. The first voice quality measurement system was developed by the ITU in the mid-1990s under the P.800 standard, "Methods for Subjective Determination of Voice Quality." The output of P.800, the Mean Opinion Score (MOS), is calculated by having a group of male and female listeners in a controlled environment, subjectively rate a series of audio recordings. MOS is scored on a 1 to 5 scale, with 4.0 and higher considered toll quality. This rating system is summarized in TABLE 1 below:

TABLE 1

| MOS Rating | | Call Characteristics | Listening Effort |
|---|---|---|---|
| 5 | Excellent | imperceptible distortion | complete relaxation, no effort required |
| 4 | Good | just perceptible distortion, not annoying | attention necessary, no appreciable effort required |
| 3 | Fair | perceptible, slightly annoying | moderate effort required |
| 2 | Poor | annoying but not objectionable | considerable effort required |
| 1 | Unsatisfactory | very annoying, objectionable | no meaning understood with any reasonable effort |

Local telephone service is generally considered to have a MOS score of 4.5. A very good digital wireless call with a high-signal-to-noise ratio (CDMA or GSM) typically scores a MOS of 3.0-3.5. The two codecs used by most often in VoIP networks, G.711 and G.729a, have MOS scores of approximately 4.4 and 3.9 respectively.

One limitation with MOS is that it can neither be applied on a wide scale nor used on a daily basis to evaluate network call quality. An alternative, Perceptual Speech Quality Measures (PSQM) is an objective approach to measure the quality of a telephone call and is based on ITU standard P.861. PSQM defines an algorithm through which a computer can derive scores based on levels of distortions to a sound file between the sent and received audio tracks. PSQM, which uses an inverted scale from MOS, provides a reasonably close correlation to MOS, with the limitation that PSQM was not originally designed for packet telephony networks and therefore only partially accounts for packet loss and jitter. Despite PSQM's limitations, it remains the method of choice because it is quantitative, repeatable and scalable. Thus, it is a preferred scale for use in conjunction with certain embodiments. The PSQM scale is summarized in TABLE 2 below:

TABLE 2

| PSQM | Type of Call |
|---|---|
| 1.15 | Local PSTN call |
| 1.20 | G.711 codec |
| 2.40 | G.729a codec |
| 3.20 | Call with slightly perceptible audio loss |
| 3.50 | Good digital mobile call |

To further simplify understanding of these scores, in certain embodiments, the scores can be equated to display colors and alert levels when the scores are displayed numerically or graphically. In one embodiment, a "yellow alert" threshold can be set at a quality score of approximately 2.8 (e.g., in the range of approximately 2.5 to 3.1) to indicate that call quality may be beginning to deteriorate. A second threshold designate "red alert" can be set at a higher threshold of degradation, say approximately 3.5 (e.g., approximately 3.3 to 3.7) to indicate that call quality has deteriorated to a degree that will be noticed by a customer.

To determine the quality formula to be used by stream quality analyzer 530, independent measurements of voice quality on the subject VoIP network are made. These measurements may be subjective (e.g., ratings by human listeners) and/or objective (e.g., scores produced by computerized voice quality testers). Simultaneous samples of network metrics (jitter, packet loss, latency, etc.) are taken by the CQA for the same sessions or links being independently observed and rated. This results in network metrics that are correlated to the voice quality scores resulting from the independent measurements.

With sets of correlated data in hand, relationships between the independently measured quality scores and the network metrics are studied in order to determine a function of the available network metrics that best matches the output of the independent measurements. Data fitting techniques such as linear regression and curve fitting or any other suitable data fitting technique may be utilized to determine the quality equation used to fit the network metrics to perceived voice quality. Ideally, quality measurements may be taken in which all but one of the correlated metrics are relatively constant, permitting study of the relationship between voice quality and the variable metric in isolation, but this is often difficult or impossible. A variety of techniques may be used to produce a formula from the correlated data that offers results of the desired accuracy and precision: linear regression analysis, curve fitting, graphing, etc. Since the relationships between quality scores and network metrics are multi-variate and often non-linear, and since the data source used by the CQA may not provide all the relevant data required to fully characterize voice quality, a series of judicious guesses may be tried to determine the formula with an optimal fit to empirical measurements.

Once the basic formula has been calibrated against independent measurements of voice quality, the range and distribution of quality scores generated by the formula may be modified to correspond to any commonly used voice scoring system (such as MOS, PSQM, PESQ, MNB, R factor or any other known or newly devised scoring system), so that the meaning of the numerical scores will be evident to those familiar with the particular scoring system chosen. In order to keep the relationship to empirical measurements intact, care should be taken during the conversion to maintain numerical correlations between checkpoints in the source and destination scoring systems (that is, scores in the two systems that are recognized as applying to similar conditions).

Figure 6:
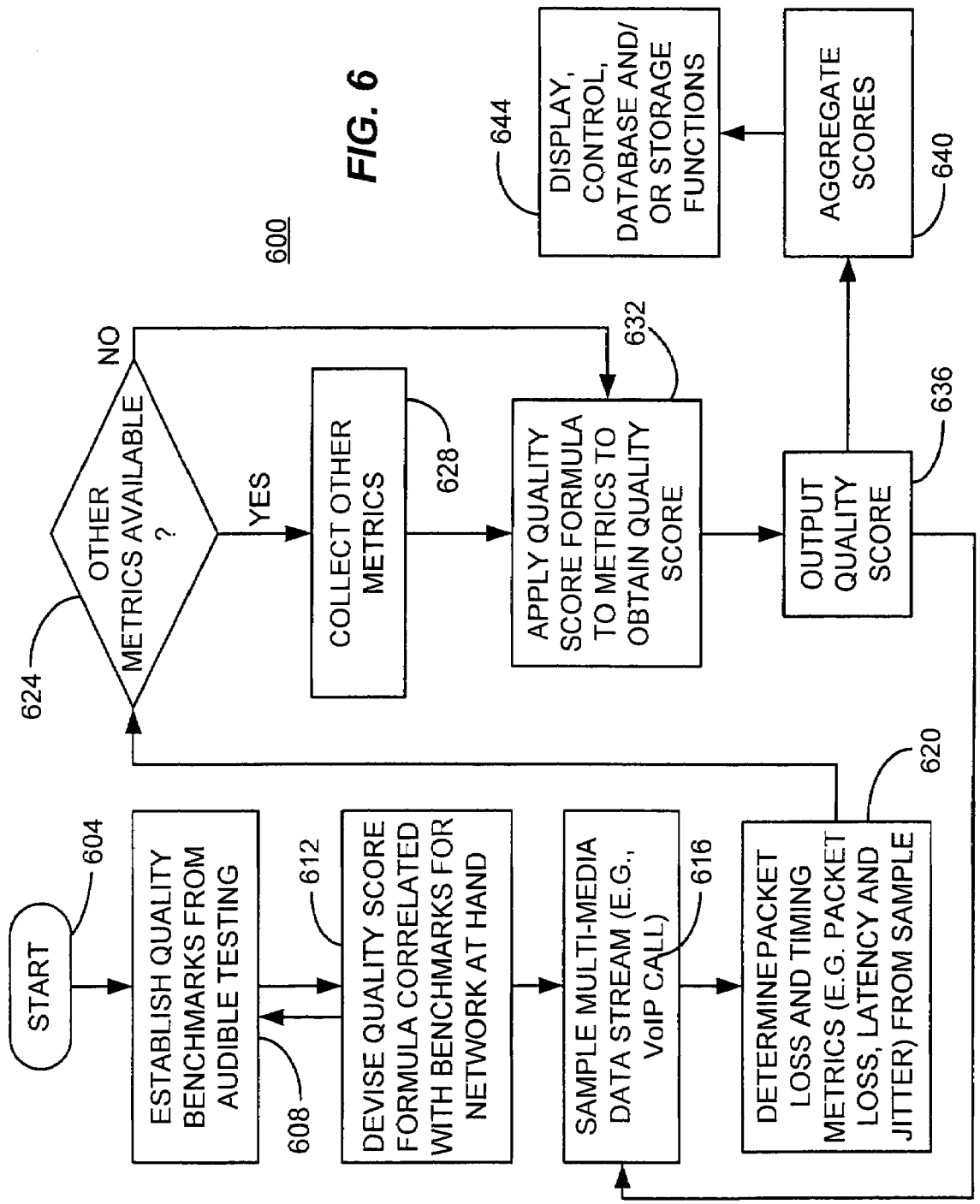
FIG. 6 is a flow chart illustrating a VoIP quality measurement process consistent with certain embodiments of the present invention.

The overall process is described as discussed above is shown as process 600 of FIG. 6, starting at 604. At 608, quality benchmarks are established using audio listening tests for calibration against a quality score Q. This testing may only need to be done once to establish thresholds and metrics for the relationship between the quality score Q and actual perceived voice quality. However, the testing may be an ongoing process of refinement and may be needed when changes are made in the network. The benchmarks are established against a quality score to devise a formula at 612 that correlates with the observed voice quality degradation in the face of various packet anomalies jitter, packet loss, latency, etc.), and thus, the process of 608 and the process of 612 may be intimately related and may lend itself to an iterative process for establishing benchmarks and refinement of the quality score.

Thus, the quality formula is developed by matching observed quality for communications over the IP network to a standard quality measurement scale, and equating the observed quality to the quality score using at least several relevant ones of the available quality metrics (at least two metrics). This is done by varying the metrics (preferably independently) and observing the effect on perceived quality.

Actual call data are sampled at 616 from the data stream representing a VoIP call by the stream collector 504 at 616. This data can be collected at any number of points along the call path to help identify sources of problems, but is preferably collected at the CODEC output (i.e., generally at the switch) to provide an end to end measurement. The stream collector 504 then generates the metrics of packet loss, and timing related metrics such as latency and jitter from the samples at 620. If other metrics are available at 624, they are also collected at 628. Whether or not other metrics are available, all available and useful or significant metrics are collected and used in the quality score formula at 632 in order to output the quality score at 636.

Using this process, the actual quality score for a given sample of a session is computed and potentially available for use in any number of manners in near real time (i.e., within a second or two of the actual samples) at this point. However, it has been found useful to actually build in delays into the process to avoid overwhelming system resources. Also, it is useful to aggregate the results of several samples at 640 prior to use for certain applications (e.g., simply displaying the results) in order to improve the accuracy of the quality scores. The score or scores can then be sent to display, alarm, control and/or storage functions at 644, so that the score and/or aggregations of scores can be displayed, stored in a database and/or used to control various network devices. In certain embodiments, scores can be updated every one to two minutes (still within the realm of near real time in this application since actions can often be taken preemptively before any service quality degradation is perceived by the customer). This provides, in certain embodiments, the ability to alert prior to the end-user perceiving a degradation in voice quality.

The same method may be used to generate quality scores for non-voice audio, video, fax, or other forms of telecommunication over a packet-switched network. Many other embodiments are possible within the scope of one of ordinary skill in the art, in view of the present teaching.

Thus, a method for near real time quality analysis consistent with certain embodiments passively samples packets from a stream of Internet Protocol (IP) packets that represent a communication session between a pair of end points carrying analog signals being transmitted over a transmission path in an IP network, and determines in near real time at least two metrics from the sampled packets for the communication session. The at least two metrics include at least one metric that measures a quantity of lost packets, and at least one metric that measures a characteristic of packet timing. The method further involves calculating a quality score in near real time using a quality formula that combines the at least two metrics.

Thus, the process takes real time samples of embedded packets and applies an algorithm which emulates the analog qualities as experienced by the human ear or eye (listener or viewer). This information can then be used to manage and troubleshoot data infrastructures being used for voice and video applications.

If one believes that in order to realize the true value of IPT, it is best to deliver a full IPT implementation as close to the caller and desktop computer as possible, then one should also acknowledge that the service provider network now includes network elements both within their controlled environment and outside of it effectively eliminating the demarcation point. Customer local area network (LAN) components then, such as routers, switches, hubs and firewalls can have a deleterious effect on voice quality, so much so that measuring and testing calls to include these components should become a service component.

One of the real world difficult aspects of implementing a call quality analysis system and method consistent with certain embodiments herein, is development of the appropriate formulae for characterizing the call quality based upon the available metrics. While any available metrics may be useful in arriving at a call quality score (Q), the metrics of jitter, packet loss and latency are readily measured using RTP data as described above. Several generalities can perhaps be made, but only after observation of significant numbers of network configurations and generation of significant numbers of quality score equations. Additionally, the quality score can be made to match to any number of standard quality scores such as PSQM or PESQ, further rendering the actual process difficult to define.

Examples are illustrative, but the reader is cautioned that what appear to be generalities in the example below could prove erroneous when larger numbers of networks are analyzed.

In the present exemplary embodiment a real-time view of quality of data streams is provided on a packet-switched network. In this exemplary application, the data streams are Voice-over-IP (VoIP) calls on a TCP/IP network, and that will be the primary context for exploring this example. In this example, calls are placed over a network having local, LAN, WAN and Internet transport media. However, the same techniques are more broadly applicable, such as to streaming video, Fax-over-IP, or other forms of communication which are dependent upon the synchronized delivery of data packets in real time.

For this example, a "stream" is hereby defined as a sequence of data packets sent over a network from a source computing device to one or more destination computing devices, where the contents of the packets are presented to the user of the destination device in a particular order and in a manner which appears continuous to the user. Normally the packet contains digitized representations of analog information: sound, pictures, video, etc. The user-perceived quality of such a stream (such as vocal fidelity for a VoIP call, or image and sound quality for a streamed movie), as previously discussed, is potentially degraded when packets are lost, arrive out of order, are delayed, or experience variable transit times, thus affecting the smoothly continuous presentation of data to the user, as described above.

In order to calculate a quality factor, somewhat more detailed definitions are useful. Following are more mathematical definitions of the metrics described above that are used to calculate stream quality in the current example:

Packet Loss=P and is defined in terms of a ratio of number of packets that never arrive at the destination, or arrive later than some predefined interval, to the number of packets produced at the source.

Latency=L and is the amount of time it takes a packet to travel from source to destination.

Jitter=J and is a measure of the variation in latency between packets. If every packet takes the same amount of time to transit the network (i.e. has the same latency), jitter is zero. The greater the variability in transit times, the higher the jitter.

Referring back to FIG. 5, the passive stream collector 504 is implemented in this example as software residing on one or more computer systems on a network. The purpose of the passive stream collector 504 is to directly sample the packets traversing the network, identify data streams, and determine raw metrics (such as packet loss, latency and jitter) which can be used to determine quality of the streams. In order to perform this function, the system on which the passive stream collector 504 software resides has access to the communications on the network. However, passive stream collector 504 is a passive element on the network, and inspects the network traffic without interfering with it.

Stream-based IP packet communications utilizes the Real Time Protocol (RTP) to carry the digitized content of the communication. Setup and teardown of the stream is handled by one of a number of other industry standard protocols (H.323, SIP, MGCP, MEGACO, Skinny, etc.), known as signaling protocols. The passive stream collector 504 processes signaling traffic, which is used to identify which RTP packets belong to which streams. Passive stream collector 504 then processes the RTP traffic to determine quality metrics.

For each RTP stream (which comprises one leg of a VoIP call, streamed video, etc.), the passive stream collector 504 examines a number of packets in sequence. In order to calculate stream quality, it is not necessary for the passive stream collector 504 to examine every packet in a stream (but this could also be done); it may take periodic samples of sequential packets, with the period adjustable for how frequently results are desired, the typical interval between packets, the capability of the computer system on which the software runs to process the packets, etc. In the current example, the interpacket interval is 20 ms, and 16 packets are sampled at a time about 3 times per minute. The sampling rate and size are easily adjustable.

As examples of how the metrics are calculated, packet loss is calculated by looking at the RTP sequence number in each packet. Gaps in the sequence represent lost packets, and the packet loss is calculated as the number of lost packets divided by the sum of received packets plus lost packets. Latency is calculated by looking at the RTP timestamp in each packet, and comparing it to the time on the passive stream collector 504 to determine transit time. This requires precise time synchronization between the source and the passive stream collector 504. Latency for the sample is the average of the latencies of the packets. Jitter is calculated by computing latency as above for each packet, then using the differences between these latencies in a standard formula given by Internet Engineering Task Force (IETF) Request for Comments (RFC) 1889. Since the time calculated for each packet is relative to those for the packets immediately preceding and following, precise synchronization between source and destination is not necessary (although abrupt time changes, such as for Daylight Savings Time, must be taken into account). Once metrics such as these are calculated for a sample, they can be used in a quality formula to determine a quality score for the sample.

The Stream Quality Analyzer (SQA) 530 is also implemented in this example as software residing on one or more computer systems on a network (perhaps the same computer as the passive stream collector 504, or perhaps a central computer system receiving metrics from multiple stream quality analyzers 530). The purpose of the SQA is to calculate individual quality scores for communications streams on the network. Data used in the calculation may come from a number of different sources, including (but not limited to): samples of network communications, in which digitized voice media is typically carried in RTP packets, as discussed above; metrics contained within Real Time Control Protocol (RTCP) packets associated with a stream; NPTP results recorded on network devices such as VoIP gateways; call metrics stored on a softswitch or other VoIP network element; call metrics stored on a handset or other end-device; and/or other metrics available from network devices.

One or more sources of data may be used, depending on what is available on the particular network. The mathematical quality formula used to calculate the quality score is derived by comparing the values of the raw data for a stream to independent measures of the stream's quality, and constructing a formula that reproduces the independently determined quality scores as closely as possible given the correlated raw data. Independent quality measurements may be subjective (such as a Mean Opinion. Score (MOS) given to a VoIP call by a panel of human listeners) and/or objective (such as a Perceptual. Speech Quality Measure (PSQM) score generated by a computerized VoIP tester).

With sets of correlated data in hand, relationships between the independently measured quality scores and the network metrics are studied in order to determine a function of the available network metrics that best matches the output of the independent measurements. Ideally, quality measurements may be taken in which all but one of the correlated metrics are relatively constant, permitting study of the relationship between stream quality and the variable metric in isolation, but often this is not the case—rendering the refinement of the equation tricky. A variety of techniques may be used to produce a formula from the correlated data that offers results of the desired accuracy and precision: linear regression analysis, graphing, etc. Since the relationships between quality scores and network metrics are typically multi-variate and non-linear, and since the data source used by the SQA may not provide all the relevant data required to fully characterize stream quality, it is often necessary to try a series of judicious guesses to determine the formula with the optimal fit to empirical measurements. For reference, in the current exemplary embodiment, the SQA formula makes use of both logarithmic and exponential functions (both of which are transcendental, non-linear functions), along with empirically determined coefficients, addends, and function arguments.

It is possible and in fact quite likely that a quality formula that is well suited to one network environment may not be applicable to another, so this general procedure may need to be repeated in whole or in part for each new environment (possibly including changes to the existing environment). Factors that distinguish network environments include logical and physical placement of network elements, signaling protocols used, intervals between RTP packets, voice or video codecs, etc.

Once the formula has been determined, the SQA 530 may continuously monitor network traffic, automatically generating quality scores for VoIP calls or other multimedia data such as streamed movies, faxes, etc.

The quality scores generated by the SQA may be used for a variety of purposes. For instance, they may be formatted for display in a dedicated web interface (known as a Stream Quality Display, or SQD), monitored by network support personnel to be made aware of situations adversely affecting stream quality. The quality data may be formatted in a number of different ways: as numerical scores, possibly matching the range of an industry-standard measure of quality (MOS, PSQM, PESQ, MNB, R factor, etc.), colors (green, yellow, red, etc.), letter grades (A, B, C, etc.), etc.

The quality scores may be fed into an automated system that generates alarms or alerts to network managers when quality degrades beyond a specified threshold. Quality data may be integrated into an existing network management system (NMS) for display and alerting. Given a properly constructed network architecture, quality data could be used to automatically modify the routing of data packets in near-real time to work around network links experiencing transient quality degradations, thus improving the end-user experience. Quality data could also be used as metrics to judge compliance with a service level agreement (SLA) guaranteeing minimum levels of quality for network services.

The scores themselves are essentially arbitrary, so once in service it's difficult to distinguish between the need to tweak the function and simply adjusting perceptions of what the numbers mean. The best way currently known to determine the function is to correlate the metrics with other quality measures. The function can be fine-tuned by continuing the process with more data.

As a guide to developing the stream quality formula, following is a discussion of the general effects on quality of each of the metrics previously mentioned. They cannot be generalized in a precise fashion, since their influences can be modified by many factors, including:

Different codecs may be more or less susceptible to quality degradation by jitter, latency, or packet loss.

Devices participating in data transfer may compensate for packet loss by filling in gaps with the use of interpolation algorithms (which themselves may do better or worse in different situations).

Devices participating in data transfer may compensate for jitter with the use of a "jitter buffer", holding packets in memory for a short time and playing them back out at regular intervals in order to reduce jitter (and packet loss, by allowing extra time for arrival) at the cost of increased latency.

Depending on where the metrics used by the SQA are obtained in the network, it may or may not be able to directly observe the effects of the compensatory mechanisms used by certain devices. For example, if the SQA is utilizing data obtained by the quality stream collector 504 on a VoIP network, the packets analyzed by the quality stream collector 504 may not be affected by gap-filling or jitter buffering taking place on a PSTN gateway or an IP phone. The particular application may dictate whether these expected effects should attempt to be taken into account when constructing the formula, or whether they should be ignored in order to gauge the performance of the network in isolation.

The formula may be constructed to output quality scores suitable for whichever scoring system is desired. In the VoIP industry, there are several systems in use: MOS, PSQM, PESQ, MNB, EMBSD, R Factor, etc. Some of these systems (MOS, PESQ, MNB, R Factor) are "positively aligned", meaning that higher scores indicate better quality; others (PSQM, EMBSD) are "negatively aligned", meaning that higher scores indicate worse quality.

Contrary to conventional wisdom that says packet loss or latency is the primary contributor to degraded packet voice quality, jitter appears to be the most significant variable in real life networks examined thus far. In experimental voice quality models, over 90% of the change in voice quality is generally a function of the voice packet arrival variability (jitter). Fixed latency does not cause significantly degraded voice quality unless the latency during a conversation exceeds the International Telecommunication Union's (ITU) recommendation of 150 ms one-way latency. Further, packet loss, particularly with the G.729a codec which was specifically designed to preserve clarity in high packet loss environments, will have unnoticeable changes in voice up to 5% packet loss, after which is quality degrades. Other codecs, such as G.711, break down rapidly in networks exceeding 1% packet loss. For this reason, the quality score is often dominated in many regions by jitter.

Packet loss, when it occurs, can have a dramatic effect on quality. However, device characteristics such as those mentioned earlier often compensate for small amounts of loss.

For this reason, subtracting (or adding, in the case of negatively aligned scoring systems) a term that varies exponentially with packet loss may work well, as may piecewise linear step and/or ramp approximations with coefficients chosen to scale to the appropriate range of scores. If the effects of device characteristics are to be ignored, then it may be more appropriate to use packet loss as a multiplicative factor for the formula as a whole.

Latency generally has a very small effect on quality, until it exceeds a certain threshold, or "latency budget" (generally considered to be approximately 150 ms for VoIP networks). Therefore, an exponential term or piecewise linear step and/or ramp approximations may also be appropriate for latency, with very little contribution under 150 ms, and increasingly greater contribution over that. Alternatively, another term that only starts meaningfully contributing after a threshold of latency can be used.

Experience has shown that under normal circumstances (little or no packet loss, latency within budget), jitter is the primary contributor to quality degradation. Even in situations of high latency, jitter tends to dominate. Jitter is usually strongly correlated with latency, making latency more an easily measurable design constraint than a primary metric for use in quality determination. As with packet loss, small amounts of jitter are often compensated for by devices on the network.

Practice has so far suggested that subtracting (or adding, in the case of negatively aligned scoring systems) a component that starts small, rises fairly quickly with increasing jitter, but with a decreasing rate of increase, seems to work well in modeling the effect of jitter. Thus, using jitter in a logarithmic, root (such as a cube root), piecewise linear approximations or even hyperbolic tangent term may be appropriate.

As one example, a quality formula taking the following form was used:

$$Q = K_1 + \ln(K_2 + K_3 J) + \exp(K_4 P), \tag{1}$$

where the K values are empirically determined constants, where Q is the quality score, J is jitter (in milliseconds), and P is packet loss (number ranging from 0 to 1).

A quality formula following this general form was used in a VoIP network environment where jitter and packet loss were the available metrics, and the output was scaled as PSQM scores. The network topology included Cisco 7960 and 7910 phones connected via 10/100 Ethernet ports to a Cisco 3524 switch with line power cards. All voice traffic is sent out of a gateway at the customer site via a T1 line to Voice Firewalls located at a specified POP. The VoIP signaling is relayed through the Voice Firewalls to the Call Agent Server at a data center. Calls are then completed via the appropriate POP's Cisco 5300, 5400 or Vocal Data gateways or a destination IP phone The formula was constructed by empirically adjusting the equation for a close match to actual data as will be explained, resulting in:

$$Q=1.4+\ln(1+0.17J)+\exp(1.1P). \qquad (2)$$

The initial term, when combined with the value of the exponential term under the usual condition of P=0, is used to produce a minimum value of 2.4, the best possible PSQM score in a VoIP network environment utilizing the G.729 codec. The middle term is zero when J=0, but results in a score of about 3.4 (perceptible distortion) when J=10, and a score of about 4.6 (nearly unintelligible) when J=50, which is equal to the normal inter-packet spacing of 20 ms on this network. The final term has a very small contribution up to about P=0.2 (20% packet loss), but increases quickly.

As a second example, an equation having the general form that follows was used:

$$Q=K_5-K_6L+K_7R+K_8J, \qquad (3)$$

where Q is the quality score, L is latency (in milliseconds), R is the sum of the squares of round-trip times (where round-trip time, or RTT, is the combined latency for transit from source to destination and back), and J is the minimum positive jitter (in milliseconds).

Again, this formula was matched to observed data and the following quality formula was used in a VoIP network environment where a variety of calculated metrics related to latency and jitter were available, and the output was scaled as PSQM scores:

$$Q=2.411-0.0105L+0.000006382R+0.0237J. \qquad (4)$$

This formula was derived from a linear regression analysis of the available data. The negative sign before the latency term may seem surprising, but it should be recalled that the variables used in this formula are not truly independent, and the latency term may serve to correct for the effects of the RTT or jitter terms.

From the above examples, it can be seen that it is difficult, if not impossible, to generalize the formula used by the stream quality analyzer 530 to generate an appropriate quality score for any given network with any specifics. These examples only use packet loss metrics and packet timing metrics, but in general, other quality metrics available from network devices should be useable to further refine an estimate of quality. It can be generally stated that the quality score can be defined as:

$$Q=f(\text{packet timing, packet loss, other quality metrics}). \qquad (5)$$

Thus, it should be noted that the above examples and guidelines are based upon a very small sample of networks, and therefore some of the suggestions given above for constructing the formula could be completely wrong for different environments. While the above guidelines may be valid, the possibility that they are in error for certain networks should be born in mind when developing a quality score formula. Once an appropriate formula is devised, basic metrics can be measured in real-time, with the formula used to generate quality scores based on those metrics in real-time, for use in a variety of contexts.

In order to track each end-point and customer for the presentation of performance data, a database can be used that links MAC addresses to some meaningful information such as:

CustomerCompany:CustomerSite:User:MAC.

or

TelephoneNumber:User:MAC or

End User Name: User: MAC.

In certain embodiments a web interface is used for viewing the quality score output which can be viewed using a suitable browser application such as Microsoft Internet Explorer™, and quality scores are updated at a reasonable periodic rate such as one minute intervals. A reference table that maps device MAC address to username and telephone number (or some other unique identifying information other than MAC address) can be used to allow a clean, user friendly interface for quality score results.

The PSQM scores, according to the present embodiment are color coded (for easy monitoring) as follows:

TABLE 3

| Color | Minimum Score (Less than or equal to) | Maximum Score (Greater than) |
|---|---|---|
| Green | 0 | 2.8 |
| Yellow | 2.8 | 3.5 |
| Red | 3.5 | 3.5< |

A Quality Score is devised to track the numerical PSQM with a scoring method that is easily understood by the general customer for reports primarily reviewed by end user customers. Several options are possible, such as a traditional grading score (A, B, C, D or F) or simple color coding (green, yellow or red). In other embodiments, the real PSQM scores may be hidden based on a browser cookie setting so that certain users such as engineers can see the numeric values and other users such as customers will only see colors.

Figure 7:
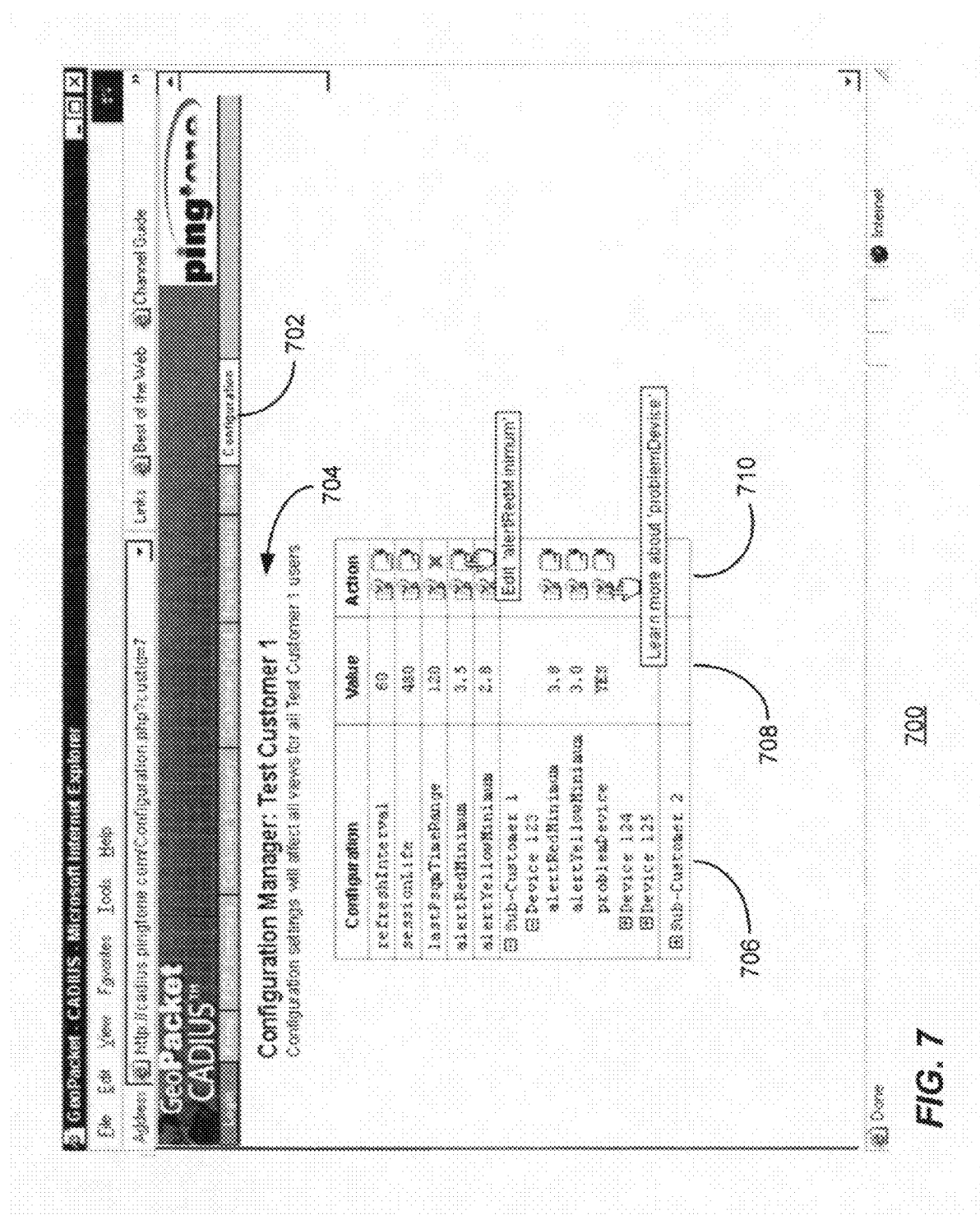
FIG. 7 is a screen shot illustrating one embodiment of a configuration management screen consistent with certain embodiments of the present invention.

Referring now to FIG. 7, a user interface screen 700 is depicted for a configuration manager screen. On this screen, basic configuration information can be set globally and based on customer. When the software is loaded by linking to an IP address or web address in a conventional manner, the configuration manager screen can be called by selecting the configuration option 702. The display then shows the configuration for a designated customer at 704. Various configuration parameters can then be observed by name in column 706 with the respective value for an associated parameter in column 708. Actions of either obtaining help as illustrated or editing a value can be carried out by selection of the appropriate icons in column 710. Of significance, in this screen, the quality scores are refreshed every 60 seconds (refreshinterval) and the red alert and yellow alert thresholds are set as per TABLE 3. These thresholds are used globally throughout the system and can be set manually or dynamically with the software responding appropriately to any changes.

Figure 8:
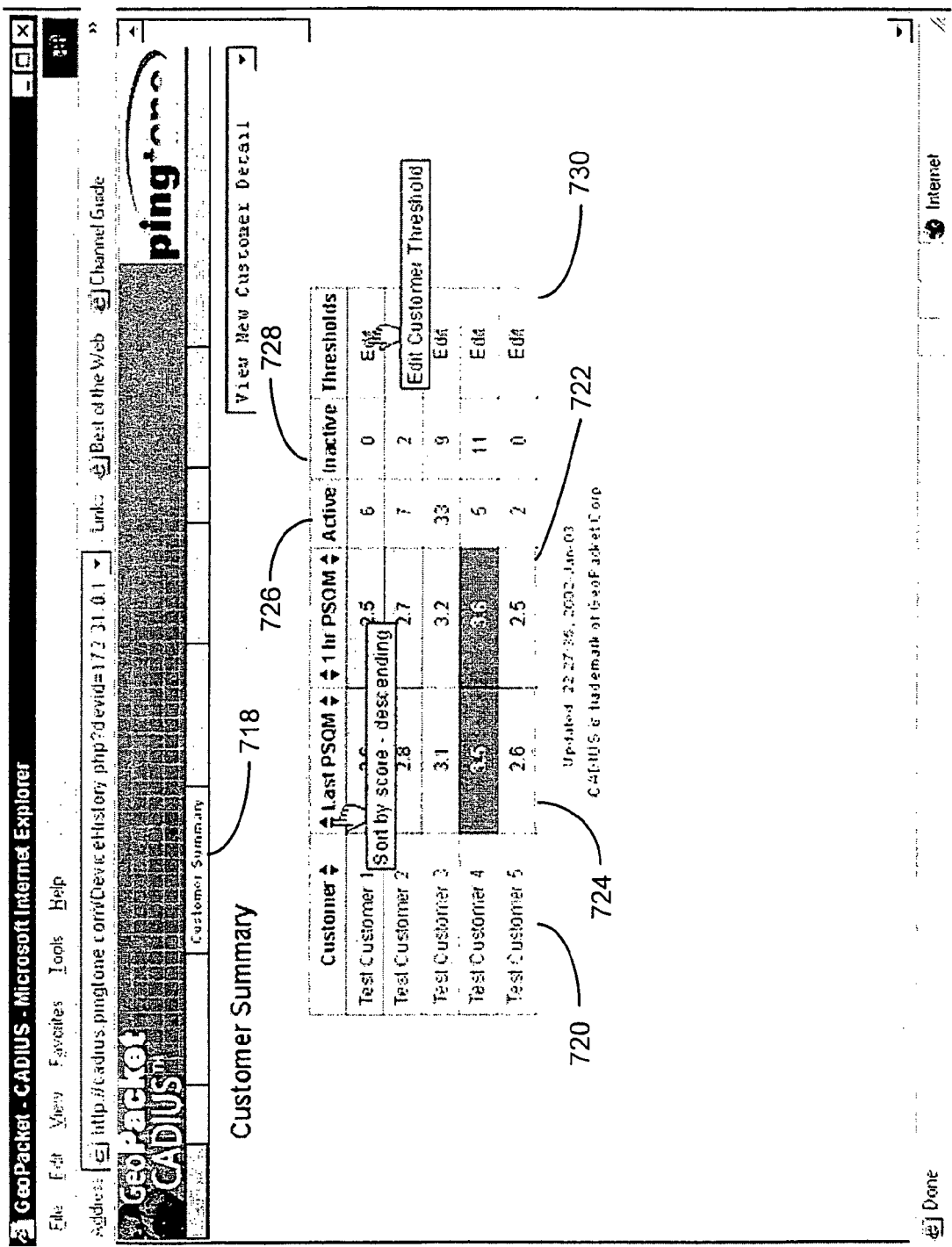
FIG. 8 is a screen shot illustrating one embodiment of a customer device history summary screen consistent with certain embodiments of the present invention.

With reference to FIG. 8, the screen shot 716 depicts the quality scoring results starting at a high level overview called Customer Summary 718. This web page presents an overall score for each customer in column 720 presented in different hourly increments in column 722. The most recent score is in column 724. This view is intended to provide with a high level overview to facilitate quickly identifying network problems for various customers. Active and inactive elements are identified in columns 726 and 728. Column 730 can be used to edit the threshold values for a given customer. The background (or foreground) color used in the cells of the table on this screen shot can be color coded to the alert level corresponding to the quality score depicted.

Figure 9:
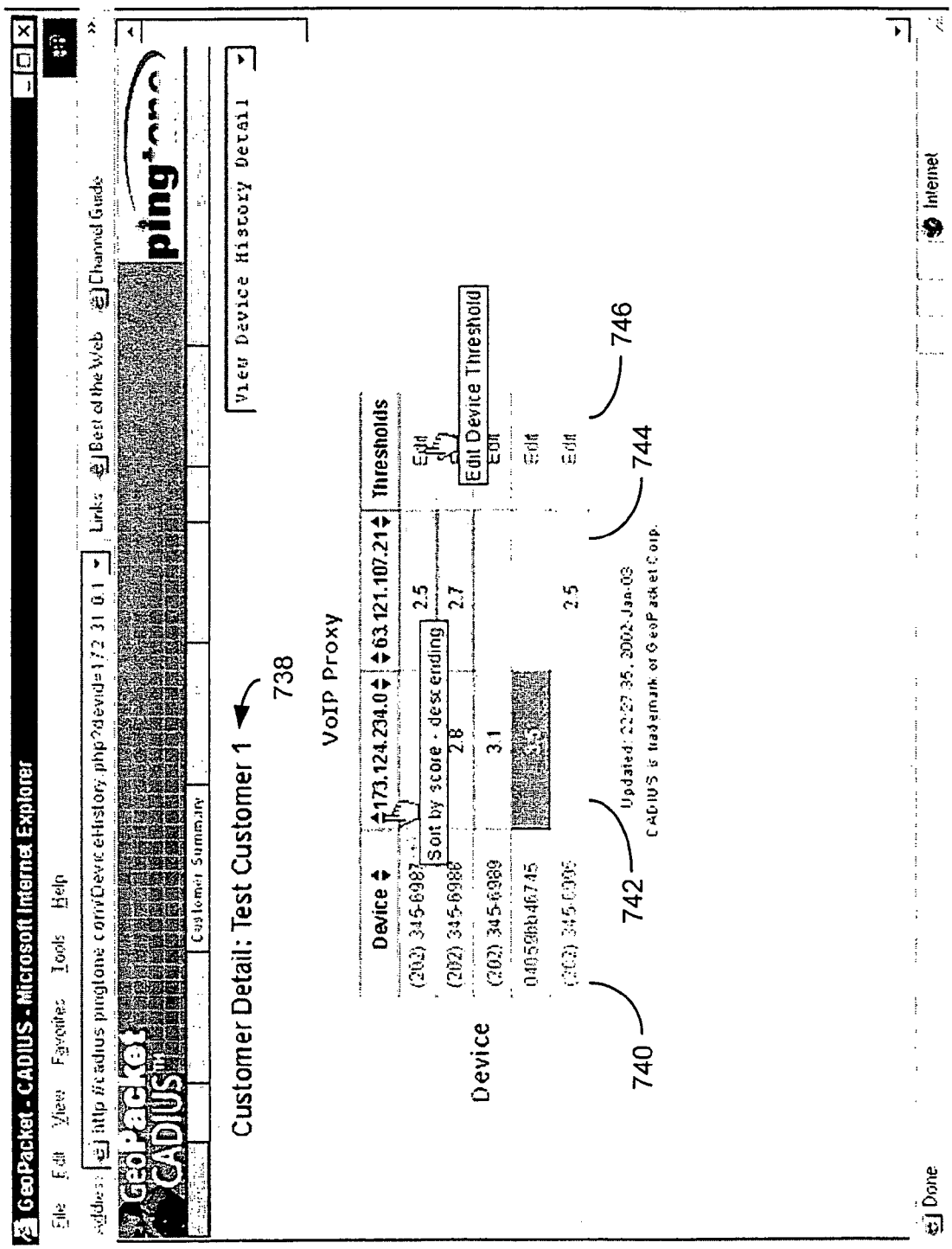
FIG. 9 is a screen shot illustrating one embodiment of a customer summary detail screen consistent with certain embodiments of the present invention.

Clicking on the company's name in the Customer Summary screen or on the menu bar calls up the Customer Detail page as depicted in FIG. 9. On this page, the customer is identified at 738 and each customer device as identified in column 740. Each end-point in the Customer Detail matrix is a link to a page devoted to historical data relating to that device. Scores for connections to each device identified by IP address are shown in columns 742 and 744. Column 746 is again used to edit thresholds. The background (or foreground) color used in the cells of the table on this screen shot can be color coded to the alert level corresponding to the quality score depicted.

Columns 742 and 744 are Voice Firewalls and are used to show the matrix of scores between the various end devices (rows illustrated by 740) and the voice firewalls 742 and 744. Although not shown explicitly in this illustration, the column headings for 742 and 744 can match the column headings (or a sub-set thereof) of those illustrated in 792 of screen shot 786 shown later. The present screen shot is a more granular look at how each end-device is routing (and the quality of that routing) to the various voice firewalls, or what is referred to as the VoIP Proxy in the software.

Each cell in columns 742 and 744 shows a quality score associated with recent sessions between the two end points that define the intersection of the cell along with the color grade associated with the quality score. In certain embodiments, the score displayed can be an average of all scores calculated for the pair of endpoints over a designated time period (e.g., the past five minutes, with the average recalculated every one minute). This time period can be made adjustable or fixed so that a longer period of average scores is more indicative of overall quality of connection between the end points, while a shorter time period is more indicative of short term or instantaneous quality for the connection between the end points. Of course, short term scores are more erratic than longer term scores due to variations resulting from network variations. If no score has been calculated for a designated pair of end points, the cell can be left blank or a historical value can be displayed with a designation as such.

Figure 10:
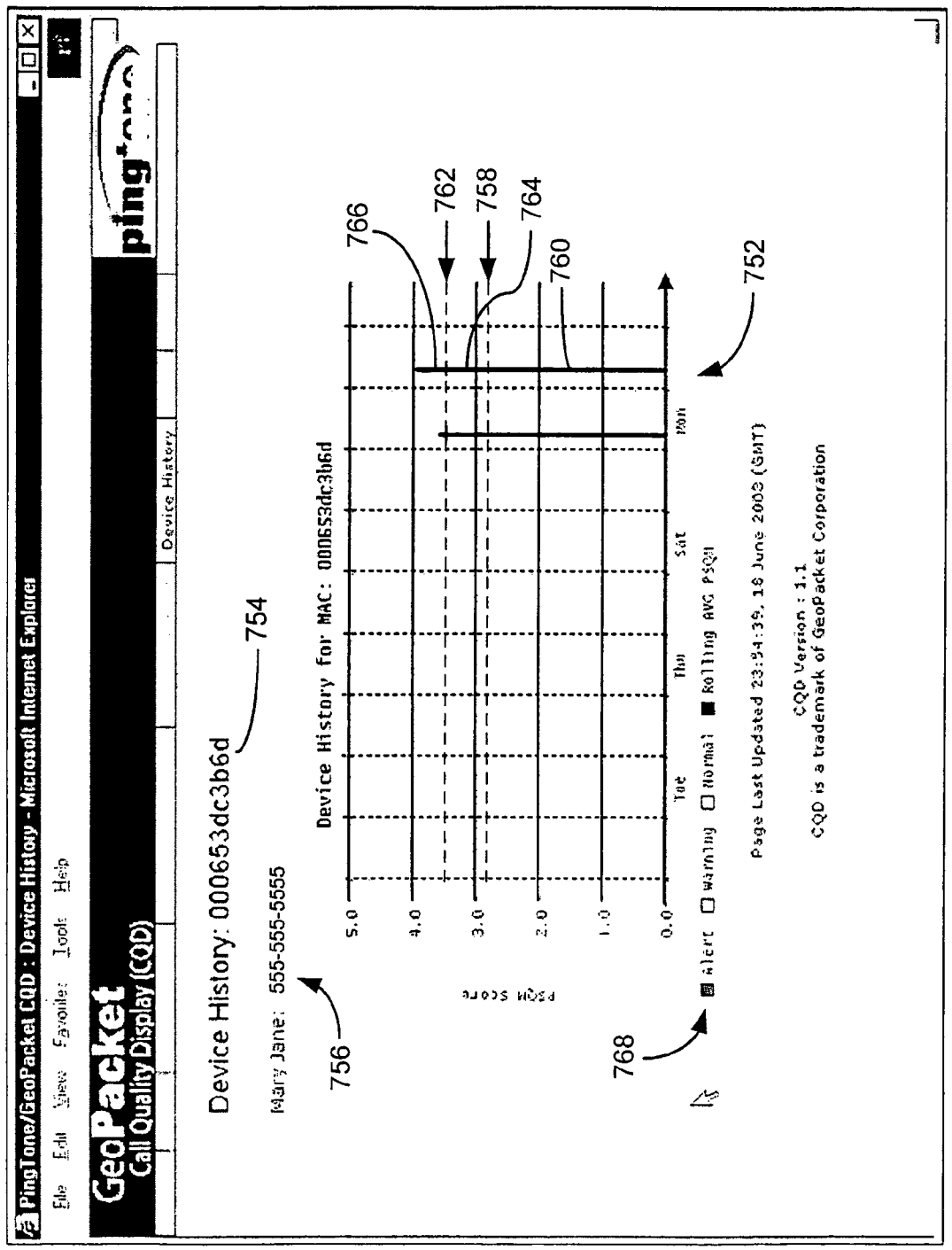
FIG. 10 is a screen shot illustrating one embodiment of device history screen consistent with certain embodiments of the present invention.

By selecting a particular device, the user can bring up screen 750 as depicted in FIG. 10. In this screen, the device history is graphically depicted in chart 752 with the device identified by coded device name 754 as well as a more user friendly identifier at 756. Preferably, this chart is color coded so that the bars of the graph are shown in green when below the yellow alert threshold 758 (e.g., at 760), yellow between the yellow alert threshold 758 and the red alert threshold 762 (e.g., at 764), and red above the red alert threshold 762 (e.g., at 766). These color codes are given meaning in the key at 768. The color thresholds established and configured in the configuration manager are the same thresholds used here and are ultimately tied together.

Figure 11:
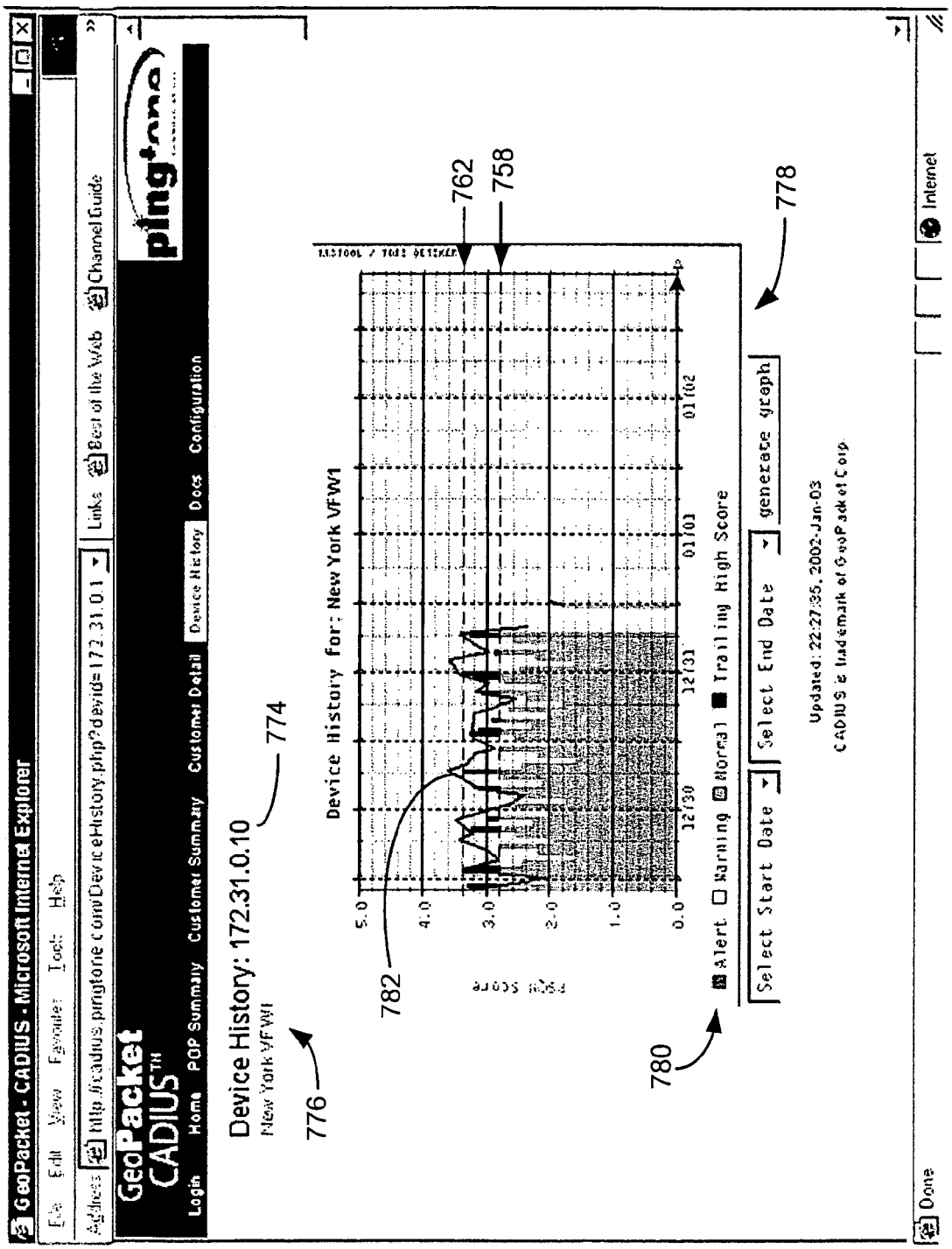
FIG. 11 is a screen shot illustrating one embodiment of a another device history screen consistent with certain embodiments of the present invention.

Additional historical detail can also be obtained as depicted in the screen shot 772 of FIG. 11. In this screen, the device is identified by IP address at 774 and by a more easily recognizable name at 776. The historical data are represented again using colors in graph 778. Again, data points are color coded as in the prior figure according to their relationship to the threshold levels 758 and 762, and the colors are keyed at 780. In this graph, a trailing high score is also shown in the solid curve 782

Figure 12:
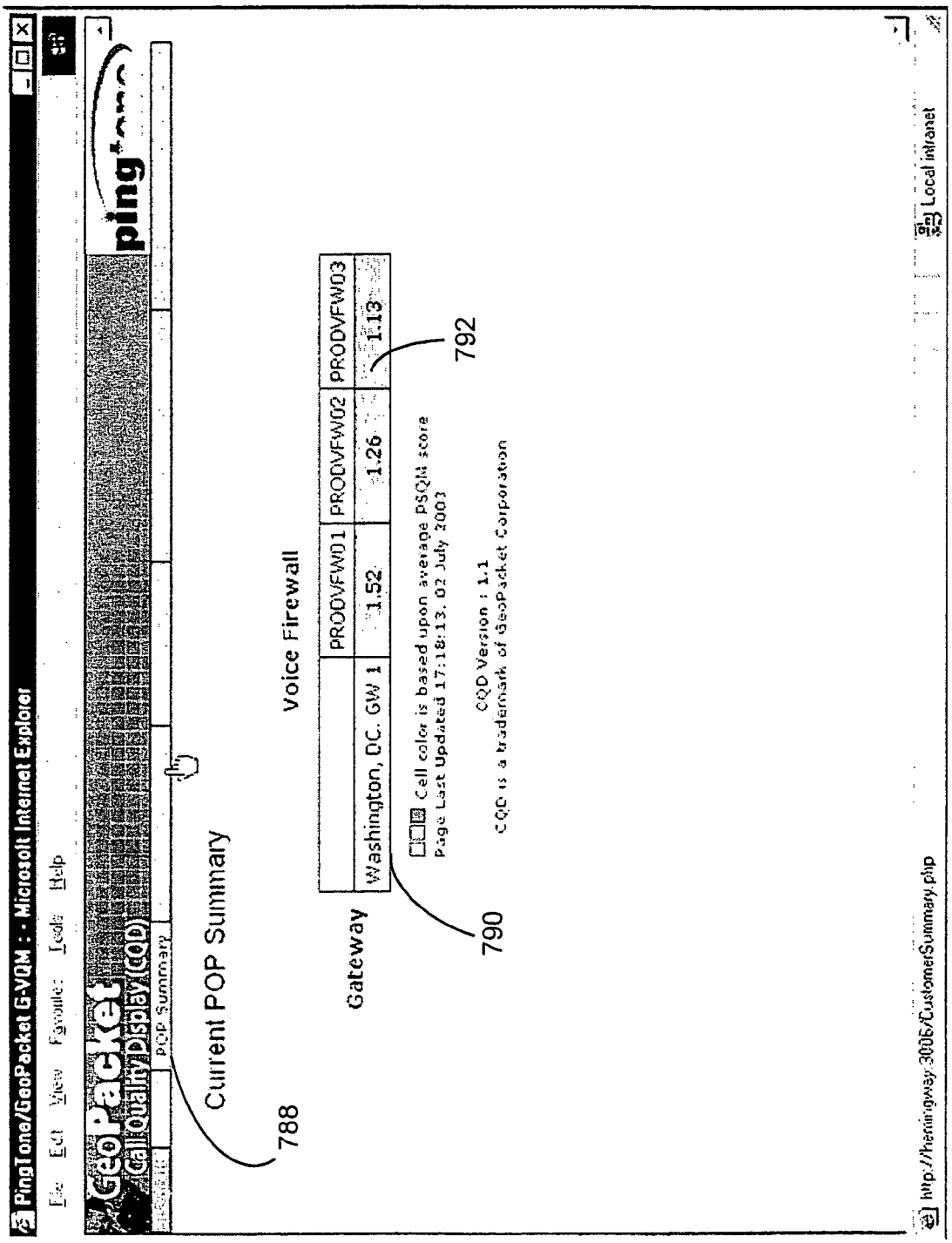
FIG. 12 is a screen shot illustrating one embodiment of point of presence (POP) summary screen consistent with certain embodiments of the present invention.

With reference to FIG. 12, by selecting the POP summary from the menu bar at 788, a summary of the current Point Of Presence can be viewed with identifying information for the POP in column 790 with scores between each voice firewall and an associated gateway appearing in columns such as 792, preferably color coded according to score.

Figure 13:
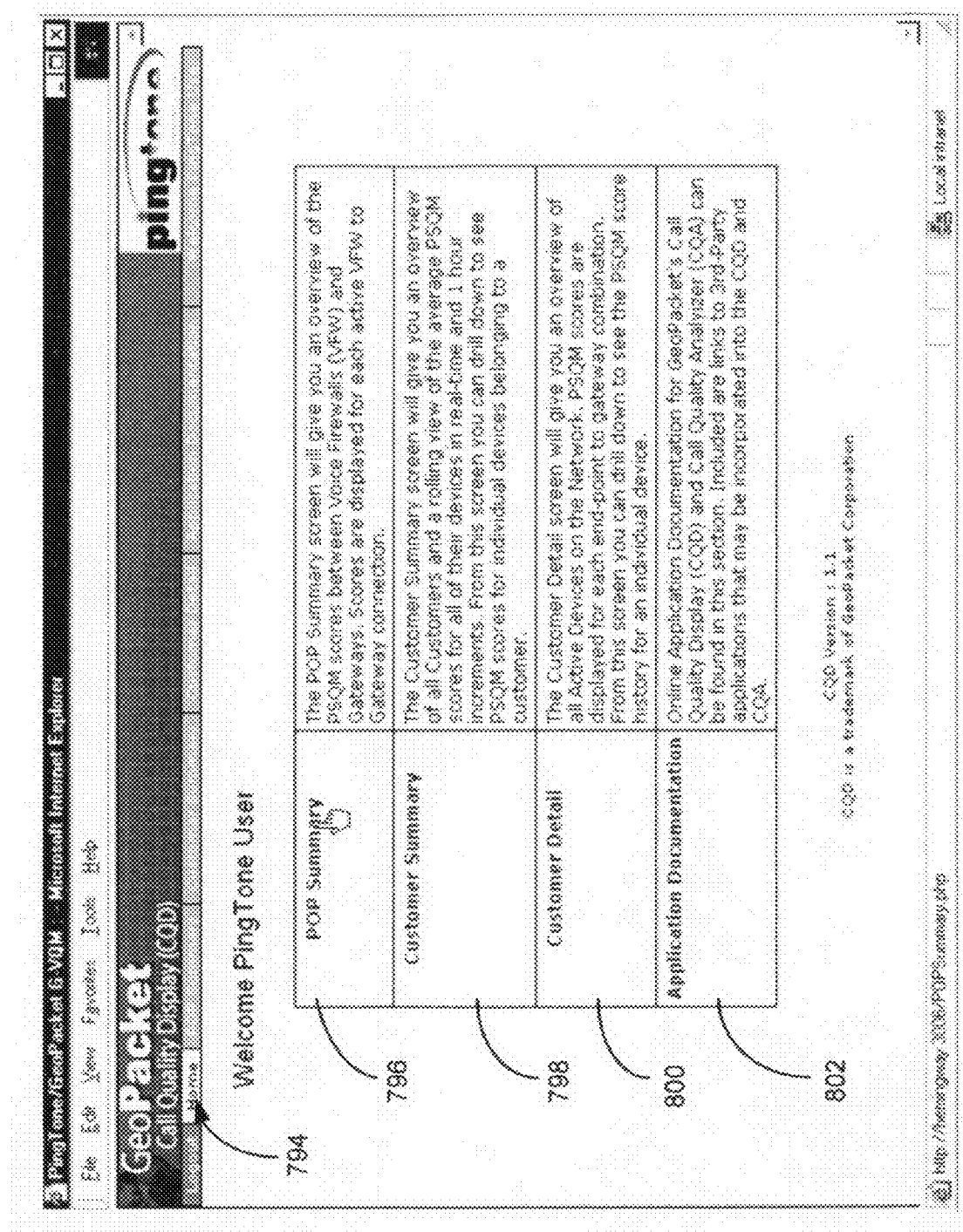
FIG. 13 is a screen shot illustrating one embodiment of a welcome screen that defines the various types of screens a customer can encounter consistent with certain embodiments of the present invention.

With reference to FIG. 13, upon initial loading of the software, or negotiation to a home page 804 using the menu bar at 794 or help page, the user may be greeted with an explanatory brief on the content of each type of screen. Row 796 explains the POP summary page 786; row 798 explains customer summary page 716; row 800 explains customer detail page 736; and row 802 explains where other application documentation can be found.

Those skilled in the art will appreciate upon consideration of this discussion of the user interface, that many other user interfaces and variations on the present interface are possible without departing from embodiments consistent with the present invention. Accordingly, these illustrative examples are intended to illustrate one technique for presenting a user interface to the quality analysis system disclosed herein without limitation.

While the present discussion has centered around use of the present technology for VoIP applications, the present techniques and systems are equally applicable to other multimedia applications without limitation. It is further noted that while the present techniques have been developed for analysis of information that originates and terminates as analog information, these techniques are not limited to such signals. For example, digital multimedia files transmitted over similar networks can be analyzed in similar ways without departing from embodiments consistent with the present invention.

Those skilled in the art will recognize, upon consideration of the above teachings, that certain of the above exemplary embodiments are based upon use of a programmed processor, e.g., to implement the CQA. However, the invention is not limited to such exemplary embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

Certain embodiments described herein, are or may be implemented using a programmed processor executing programming instructions that are broadly described above that can be stored on any suitable electronic or computer readable storage medium and/or can be transmitted over any suitable electronic communication medium. However, those skilled in the art will appreciate, upon consideration of the present teaching, that the processes described above can be implemented in any number of variations and in many suitable programming languages without departing from embodiments of the present invention. For example, the order of certain operations carried out can often be varied, additional operations can be added or operations can be deleted without departing from certain embodiments of the invention. Error trapping can be added and/or enhanced and variations can be made in user interface and information presentation without departing from certain embodiments of the present invention. Such variations are contemplated and considered equivalent.

Software and/or firmware embodiments may be implemented using a programmed processor executing programming instructions that in certain instances are broadly described above in flow chart form that can be stored on any suitable electronic or computer readable storage medium (such as, for example, disc storage, Read Only Memory (ROM) devices, Random Access Memory (RAM) devices, network memory devices, optical storage elements, magnetic storage elements, magneto-optical storage elements, flash memory, core memory and/or other equivalent volatile and non-volatile storage technologies). However, those skilled in the art will appreciate, upon consideration of the present teaching, that the processes described above can be implemented in any number of variations and in many suitable programming languages without departing from embodiments of the present invention. For example, the order of certain operations carried out can often be varied, additional operations can be added or operations can be deleted without departing from certain embodiments of the invention. Error trapping can be added and/or enhanced and variations can be made in user interface and information presentation without departing from certain embodiments of the present invention. Such variations are contemplated and considered equivalent.

While certain illustrative embodiments have been described, it is evident that many alternatives, modifications, permutations and variations will become apparent to those skilled in the art in light of the foregoing description.

The invention claimed is:

1. A near real time quality analyzer, comprising:
a passive stream collector that passively samples packets from a stream of Internet Protocol (IP) packets that represent a communication session between a pair of end points carrying analog signals being transmitted over a transmission path in an IP network, and determines in near real time at least two metrics from the sampled packets for the communication session;
wherein the at least two metrics comprise:
at least one metric that measures a quantity of lost packets; and
at least one metric that measures a characteristic of packet jitter;
a stream quality analyzer that receives the at least two metrics and calculates a quality score in near real time using a quality formula that combines the at least two metrics; and
wherein the quality formula takes the general form of:

$Q=K_1+\ln(K_2+K_3 J)+exp(K_4 P)$ where Q is the quality score, the values of $K_1$, $K_2$, $K_3$ and $K_4$ are constants, J is jitter, and P is packet loss.

2. The near real time quality analyzer according to claim 1, wherein at least one additional metric that measures a characteristic of packet timing that measures at least one of, packet latency, and round trip time.

3. The near real time quality analyzer according to claim 1, wherein the passive stream collector samples packets at a switch.

4. The near real time quality analyzer according to claim 1, wherein the passive stream collector samples all packets entering and leaving a switch.

5. The near real time quality analyzer according to claim 1, wherein the stream quality analyzer receives additional metrics from network devices residing in the IP network along the transmission path, and wherein the quality formula incorporates functions of the additional metrics.

6. The near real time quality analyzer according to claim 5, wherein the additional metrics comprise at least one of a soft switch call metric, call metrics stored on an end-device, a VoIP (Voice over IP) network component, and a Network Performance Test Probe (NPTP) result.

7. The near real time quality analyzer according to claim 1, wherein the Internet Protocol (IP) packets that represent analog voice signals in which digitized voice is carried in Real Time Protocol (RTP) packets.

8. The near real time quality analyzer according to claim 1, wherein the at least two metrics are derived from data within Real Time Control Protocol (RTCP) packets.

9. The near real time quality analyzer according to claim 1, wherein the quality score is stored in a database indexed to the pair of end points.

10. The near real time quality analyzer according to claim 1, further comprising means for generating an alarm whenever the quality score falls below a quality threshold.

11. The near real time quality analyzer according to claim 1, further comprising a display wherein the quality score is displayed on the display.

12. The near real time quality analyzer according to claim 11, wherein the display further displays historical quality scores associated with the end points.

13. The near real time quality analyzer according to claim 1, wherein the stream quality analyzer aggregates a plurality of quality scores.

14. The near real time quality analyzer according to claim 1, wherein the passive stream collector and the stream quality analyzer are implemented as programmed processes on a computer.

15. The near real time quality analyzer according to claim 1, wherein the quality formula is developed by matching observed quality for communications over the IP network to a standard quality measurement scale, and equating the observed quality to the quality score as the at least two metrics are varied.

16. The near real time quality analyzer according to claim 1, wherein the quality formula is designed to approximate a Perceptual Speech Quality Measurement (PSQM) score.

17. The near real time quality analyzer according to claim 16, wherein an alert threshold level is defined for quality scores of approximately 3.5.

18. The near real time quality analyzer according to claim 16, wherein an alert threshold level is defined for quality scores of approximately 3.3 to 3.7.

19. The near real time quality analyzer according to claim 16, wherein an alert threshold level is defined for quality scores of approximately 2.8.

20. The near real time quality analyzer according to claim 16, wherein an alert threshold level is defined for quality scores of approximately 2.5 to 3.1.

21. The near real time quality analyzer according to claim 16, wherein a low level alert threshold level is defined for quality scores of approximately 2.8, and wherein a higher level alert threshold level is defined for quality scores of approximately 3.5.

22. The near real time quality analyzer according to claim 16, wherein quality scores exceeding the low level alert threshold level but not the higher level alert threshold are color coded as yellow quality level, and wherein quality scores exceeding the higher level alert threshold level are color coded as red quality level, and wherein quality scores lower than the low level alert threshold is color coded as a green quality level.

23. The near real time quality analyzer according to claim 1, wherein:
a low level alert threshold and a high level alert threshold are established, and wherein,
quality scores exceeding the low level alert threshold level but not the higher level alert threshold are color coded as yellow quality level, and wherein quality scores exceeding the higher level alert threshold level are color coded as red quality level, and wherein quality scores lower than the low level alert threshold is color coded as a green quality level.

24. The near real time quality analyzer according to claim 23, further comprising means for displaying the quality score on a display using color codes for to indicate the quality score's relationship to the alert levels.

25. The near real time quality analyzer according to claim 23, wherein the quality score is compared to at least one threshold that is established either manually or dynamically.

26. A near real time quality analyzer, comprising:

a passive stream collector that passively samples packets from a stream of Real Time Protocol (RTP) Internet Protocol (IP) packets entering and leaving a switch, wherein the stream of packets represents a communication session between a pair of end points carrying analog signals being transmitted over a transmission path in an IP network, and determines in near real time at least two metrics from the sampled packets for the communication session;

wherein the at least two metrics are derived from data contained within Real Time Control Protocol packets comprise:

at least one metric that measures a quantity of lost packets; and at least one metric that measures a characteristic of packet jitter;

a stream quality analyzer that receives the at least two metrics and calculates a quality score in near real time using a quality formula that combines the at least two metrics, wherein the stream quality analyzer aggregates a plurality of quality scores; and wherein the quality formula takes the general form of:

$$Q=K_1+\ln(K_2+K_3 J)+exp(K_4 P)$$

where Q is the quality score, the values of $K_1 K_2 K_3$ and $K_4$ are constants, J is jitter, and P is packet loss;

a database, receiving the quality score from the stream quality analyzer and storing the quality score indexed to the pair of end points;

means for comparing the quality score with a quality threshold and generating an alarm whenever the quality score falls below a quality threshold; and a display that displays the quality score along with historical quality scores associated with the end points.

27. The near real time quality analyzer according to claim 26, wherein the stream quality analyzer receives additional metrics from network devices residing in the IP network along the transmission path, and wherein the quality formula incorporates functions of the additional metrics.

28. The near real time quality analyzer according to claim 26, wherein:

a low level alert threshold and a high level alert threshold are established, and wherein, quality scores exceeding the low level alert threshold level but not the higher level alert threshold are color coded as yellow quality level, and wherein quality scores exceeding the higher level alert threshold level are color coded as red quality level, and wherein quality scores lower than the low level alert threshold is color coded as a green quality level.

29. A method for near real time quality analysis, comprising:

passively sampling packets from a stream of Internet Protocol (IP) packets that represent a communication session between a pair of end points carrying analog signals being transmitted over a transmission path in an IP network, and determining in near real time at least two metrics from the sampled packets for the communication session;

wherein the at least two metrics comprise:

at least one metric that measures a quantity of lost packets;

at least one metric that measures a characteristic of packet latency; calculating a quality score in near real time using a quality formula that combines the at least two metrics; and wherein a packet latency metric is modeled in the quality formula as either an exponential term or a piecewise linear function in which the overall quality score shows a sharp decline in quality when packet latency exceeds approximately 150 ms and a low effect on quality score when packet latency is below approximately 150 ms.

30. The method for near real time quality analysis according to claim 29, wherein at least one additional metric is measured that measures a characteristic of packet timing in the form of one of packet latency, and round trip time.

31. The method for near real time quality analysis according to claim 29, wherein the packets are sampled at a switch.

32. The method for near real time quality analysis according to claim 29, wherein the samples are taken at a switch, and wherein the samples are taken of all packets entering and leaving the switch.

33. The method for near real time quality analysis according to claim 29, further comprising receiving additional metrics from network devices residing in the IP network along the transmission path, and wherein the quality formula incorporates functions of the additional metrics.

34. The method for near real time quality analysis according to claim 33, wherein the additional metrics comprise at least one of a soft switch call metric, call metrics stored on an end-device a VoIP (Voice over IP) network component, and a Network Performance Test Probe NPTP result.

35. The method for near real time quality analysis according to claim 29, wherein the Internet Protocol (IP) packets that represent analog voice signals in which digitized voice is carried in Real Time Protocol (RTP) packets.

36. The method for near real time quality analysis according to claim 29, wherein the at least two metrics are derived from data in Real Time Control Protocol (RTCP) packets.

37. The method for near real time quality analysis according to claim 29, further comprising storing the quality score in a database indexed to the pair of end points.

38. The method for near real time quality analysis according to claim 29, further comprising generating an alarm whenever the quality score falls below a quality threshold 39. The method for near real time quality analysis according to claim 29, further comprising displaying the quality score on a display.

40. The method for near real time quality analysis according to claim 39, wherein the display further displays historical quality scores associated with the end points.

41. The method for near real time quality analysis according to claim 29, further comprising aggregating a plurality of quality scores.

42. The method for near real time quality analysis according to claim 29, wherein the process is carried out on a programmed processor.

43. The method for near real time quality analysis according to claim 29, wherein the quality formula is developed by matching observed quality for communications over the IP network to a standard quality measurement scale, and equating the observed quality to the quality score as the at least two metrics are varied.

44. The method for near real time quality analysis according to claim 29, wherein:
the quality formula is designed to approximate a Perceptual Speech Quality Measurement (PSQM) score, and wherein
a low level alert threshold level is defined for quality scores of approximately 2.8, and wherein
a higher level alert threshold level is defined for quality scores of approximately 3.5.

45. The method for near real time quality analysis according to claim 44, wherein quality scores exceeding the low level alert threshold level but not the higher level alert threshold are color coded as yellow quality level, and wherein quality scores exceeding the higher level alert threshold level are color coded as red quality level, and wherein quality scores lower than the low level alert threshold is color coded as a green quality level.

46. The method for near real time quality analysis according to claim 29, wherein:
a low level alert threshold and a high level alert threshold are established, and wherein,
quality scores exceeding the low level alert threshold level but not the higher level alert threshold are color coded as yellow quality level, and wherein
quality scores exceeding the higher level alert threshold level are color coded as red quality level,
and wherein quality scores lower than the low level alert threshold is color coded as a green quality level.

47. The method for near real time quality analysis according to claim 46, further comprising displaying the quality score on a display using color codes for to indicate the quality score's relationship to the alert levels.

48. The method for near real time quality analysis according to claim 29, wherein a packet loss metric is modeled in the quality formula as either an exponential term or a piecewise linear function in which the overall quality score shows a sharp decline in quality when packet loss exceeds a threshold.

49. The method for near real time quality analysis according to claim 29, wherein a packet latency metric is modeled in the quality formula as an overall formula multiplier.

50. The method for near real time quality analysis according to claim 29, wherein a packet jitter metric is modeled in the quality formula as either a logarithmic term, or a hyperbolic tangent function or as a piecewise linear function.

51. A computer readable electronic storage medium storing instructions that when executed on one or more programmed processors carry out the method according to claim 29.

52. A near real time quality analyzer, comprising:
a passive stream collector that passively samples packets from a stream of Internet Protocol (IP) packets that represent a communication session between a pair of end points carrying analog signals being transmitted over a transmission path in an IP network, and determines in near real time at least two metrics from the sampled packets for the communication session;
wherein the at least two metrics comprise:
at least one metric that measures a quantity of lost packets;
at least one metric that measures a characteristic of packet timing; and
a stream quality analyzer that receives the at least two metrics and calculates a quality score in near real time using a quality formula that combines the at least two metrics; and
wherein the quality formula takes the general form of:

$$Q = K_5 - K_6 L + K_7 R + K_8 J$$

where Q is the quality score, $K_5, K_6, K_7$, and $K_8$ are constants, L is latency, R is the sum of the squares of round-trip times, where round-trip time is the combined latency for transit between the pair of end points, and J is a minimum positive jitter.

53. A method for near real time quality analysis, comprising:
passively sampling packets from a stream of Internet Protocol (IP) packets that represent a communication session between a pair of end points carrying analog signals being transmitted over a transmission path in an IP network, and determining in near real time at least two metrics from the sampled packets for the communication session;
wherein the at least two metrics comprise:
at least one metric that measures a quantity of lost packets;
at least one metric that measures a characteristic of packet timing;
calculating a quality score in near real time using a quality formula that combines the at least two metrics; and
wherein a packet loss metric is modeled in the quality formula as either an exponential term or a piecewise linear function in which the overall quality score shows a sharp decline in quality when packet loss exceeds a threshold.

54. A computer readable electronic storage medium storing instructions that when executed on one or more programmed processors carry out the method according to claim 29.

* * * * *